US012670157B2

(12) United States Patent
Karim et al.

(10) Patent No.: US 12,670,157 B2
(45) Date of Patent: Jun. 30, 2026

(54) SYSTEMS AND METHODS FOR GENERATING AND SYNCHRONIZING MATERIALIZED VIEWS

(71) Applicant: Zuora, Inc., Redwood City, CA (US)

(72) Inventors: Shakir Karim, Oakland, CA (US); Tanmoy Dutta, Redwood City, CA (US); Dhrumil Munshi, Redwood City, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

(21) Appl. No.: 18/582,416

(22) Filed: Feb. 20, 2024

(65) Prior Publication Data

US 2025/0265245 A1    Aug. 21, 2025

(51) Int. Cl.
 G06F 16/2453 (2019.01)
 G06F 16/23 (2019.01)
 G06F 16/27 (2019.01)

(52) U.S. Cl.
 CPC ........ G06F 16/24539 (2019.01); G06F 16/27 (2019.01)

(58) Field of Classification Search
 CPC .. G06F 16/24539; G06F 16/27; G06F 16/275; G06F 16/2393; G06F 16/2456
 USPC ................................................. 707/624, 610
 See application file for complete search history.

(56) References Cited

U.S. PATENT DOCUMENTS

| | | | | |
|---|---|---|---|---|
| 6,546,402 B1 * | 4/2003 | Beyer | ................ | G06F 16/2393 |
| | | | | 707/625 |
| 8,972,459 B2 * | 3/2015 | Chaliparambil | ...... | G06F 16/245 |
| | | | | 707/803 |
| 11,030,189 B2 * | 6/2021 | Arye | ................... | G06F 16/2282 |
| 2004/0193622 A1 * | 9/2004 | Peleg | ................. | G06F 16/27 |
| 2005/0091180 A1 * | 4/2005 | Peleg | ................. | G06F 16/2393 |
| 2008/0097962 A1 * | 4/2008 | Santosuosso | ..... | G06F 16/24539 |
| 2019/0171650 A1 * | 6/2019 | Botev | ................. | G06F 16/2358 |
| 2019/0213203 A1 * | 7/2019 | Lee | ..................... | G06F 16/2379 |
| 2020/0334232 A1 * | 10/2020 | Arye | ................... | G06F 16/215 |
| 2020/0334254 A1 * | 10/2020 | Arye | ................... | G06F 16/2393 |
| 2020/0379995 A1 * | 12/2020 | Rajaperumal | ....... | G06F 16/2393 |
| 2021/0165782 A1 * | 6/2021 | Deshpande | ......... | G06F 16/2393 |
| 2021/0165803 A1 * | 6/2021 | Deshpande | ............ | G06F 16/26 |

(Continued)

FOREIGN PATENT DOCUMENTS

EP        2601600 B1 * 10/2023 ......... G06F 16/2393

*Primary Examiner* — Dennis Truong
(74) *Attorney, Agent, or Firm* — Fish & Richardson P.C.

(57)        ABSTRACT
The multi-tenant system includes one or more hardware processors that obtain a query that includes statements defining one or more operations to be performed on a subset of constituent records stored in a source database. The hardware processors parse the query to decipher a type of the one or more operations, the subset of the constituent records referred to, and one or more other conditions of the operations. The hardware processors obtain the subset of the constituent records from the parsed query from the source database. The hardware processors execute the one or more operations, to generate a materialized view that denormalizes the data. The hardware processors detect any changes in the subset of the constituent records, synchronize the materialized view with the any changes, store the synchronized materialized view within a data platform, and transmit the synchronized materialized view to a target database.

20 Claims, 19 Drawing Sheets

(56)        References Cited

U.S. PATENT DOCUMENTS

| | | | |
|---|---|---|---|
| 2022/0253433 A1* | 8/2022 | Deshpande | G06F 16/2393 |
| 2023/0021006 A1* | 1/2023 | Jiang | G06F 16/24539 |
| 2023/0205785 A1* | 6/2023 | Katsipoulakis | G06F 9/466 |
| | | | 707/613 |
| 2023/0401189 A1* | 12/2023 | Katsipoulakis | G06F 16/2272 |
| 2024/0403288 A1* | 12/2024 | Stride | G06F 16/24535 |

* cited by examiner

Processing System(s) 109

Query Obtaining Engine — 202

Parsing Engine — 204

Constituent Data Obtaining Engine — 206

Watermark Maintaining Engine — 208

Materialized View Generating Engine — 210

Materialized View Synchronizing Engine — 212

Watermark Maintaining Engine 208

Pending Transaction Detecting Engine ⌐ 302

Watermark Updating Engine ⌐ 304

In this incremental update, capture
updated records in rows $r_3$ and $r_4$

In this incremental update, capture
updated records in rows $r_1$ and $r_2$

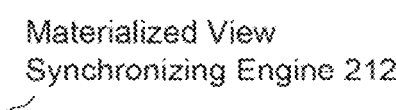
Materialized View
Synchronizing Engine 212
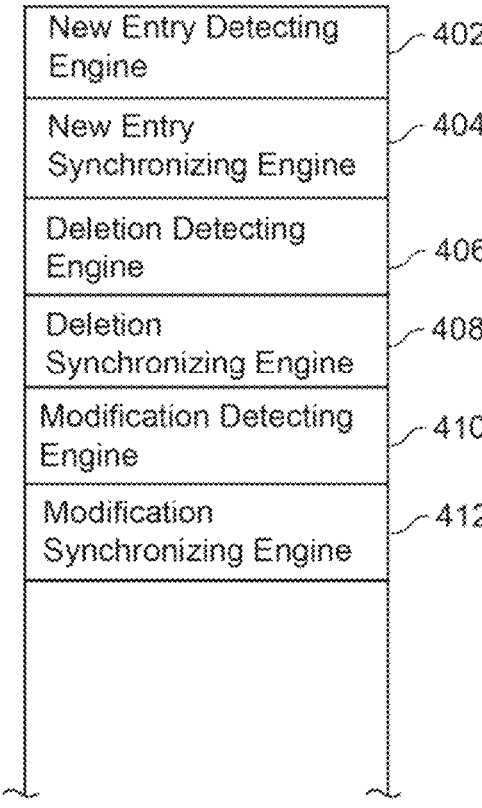
| | |
|---|---|
| New Entry Detecting Engine | 402 |
| New Entry Synchronizing Engine | 404 |
| Deletion Detecting Engine | 406 |
| Deletion Synchronizing Engine | 408 |
| Modification Detecting Engine | 410 |
| Modification Synchronizing Engine | 412 |
FIG. 4

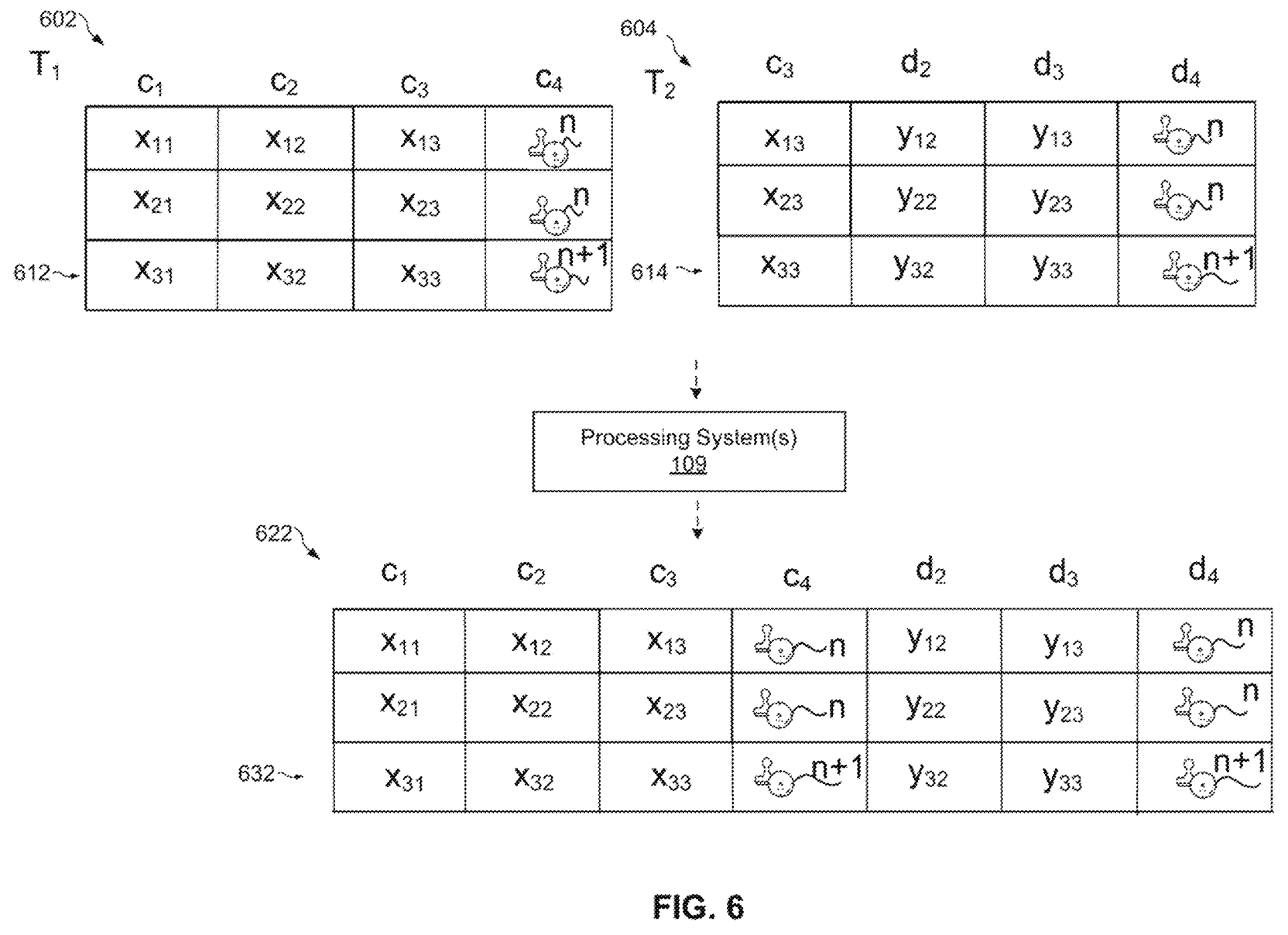

602 — $T_1$ (612):

| $c_1$ | $c_2$ | $c_3$ | $c_4$ |
|---|---|---|---|
| $x_{11}$ | $x_{12}$ | $x_{13}$ | [icon] $n$ |
| $x_{21}$ | $x_{22}$ | $x_{23}$ | [icon] $n$ |
| $x_{31}$ | $x_{32}$ | $x_{33}$ | [icon] $n+1$ |

604 — $T_2$ (614):

| $c_3$ | $d_2$ | $d_3$ | $d_4$ |
|---|---|---|---|
| $x_{13}$ | $y_{12}$ | $y_{13}$ | [icon] $n$ |
| $x_{23}$ | $y_{22}$ | $y_{23}$ | [icon] $n$ |
| $x_{33}$ | $y_{32}$ | $y_{33}$ | [icon] $n+1$ |

Processing System(s) 109

622 / 632:

| $c_1$ | $c_2$ | $c_3$ | $c_4$ | $d_2$ | $d_3$ | $d_4$ |
|---|---|---|---|---|---|---|
| $x_{11}$ | $x_{12}$ | $x_{13}$ | [icon] $n$ | $y_{12}$ | $y_{13}$ | [icon] $n$ |
| $x_{21}$ | $x_{22}$ | $x_{23}$ | [icon] $n$ | $y_{22}$ | $y_{23}$ | [icon] $n$ |
| $x_{31}$ | $x_{32}$ | $x_{33}$ | [icon] $n+1$ | $y_{32}$ | $y_{33}$ | [icon] $n+1$ |

FIG. 6

1002          1004          1006          1008 zb_invoice_detail    zb_invoice    zb_subscription    zb_subscriptioncomponent

| uuid | updated_on |
|------|-----------|
| 12345 | 2010-09-01 00:00:00 |
|  | 2023-09-01 00:00:00 |

| uuid | updated_on |
|------|-----------|
| 1232456 |  |

| name | updated_on |
|------|-----------|
|  |  |

| id | updated_on |
|------|-----------|
|  |  |

1010

```
SELECT
      ii.uuid AS External_Id__c @pk(1),
      ii.updated_on AS ii_updated_on @track(ii_updated_on, timestamp),
      inv.uuid AS invoice_id @pk(2),
      inv.updated_on AS inv_updated_on @track(inv_updated_on, timestamp)
      sb.name AS name,
      sc.id AS id
FROM
      zb_invoice_detail ii
      INNER JOIN zb_invoice inv on ii.invoice_id = inv.uuid
      LEFT JOIN zb_subscription sb on sb.id = ii.subscription_id
      LEFT JOIN zb_subscriptioncomponent sc on sc.id = ii.subscription_component_id
WHERE
      ii.tenant_id = {{{bind:tenant_id@varchar}}}
      AND inv.tenant_id = {{{bind:tenant_id@varchar}}}
      AND ii.deleted = 0
      AND inv.status = 'Posted'
      AND ii.updated_on >= {{{track:ii_updated_on@timestamp}}}
      AND ii.updated_on <= NOW ()
```

```
Processing System(s)
109
```

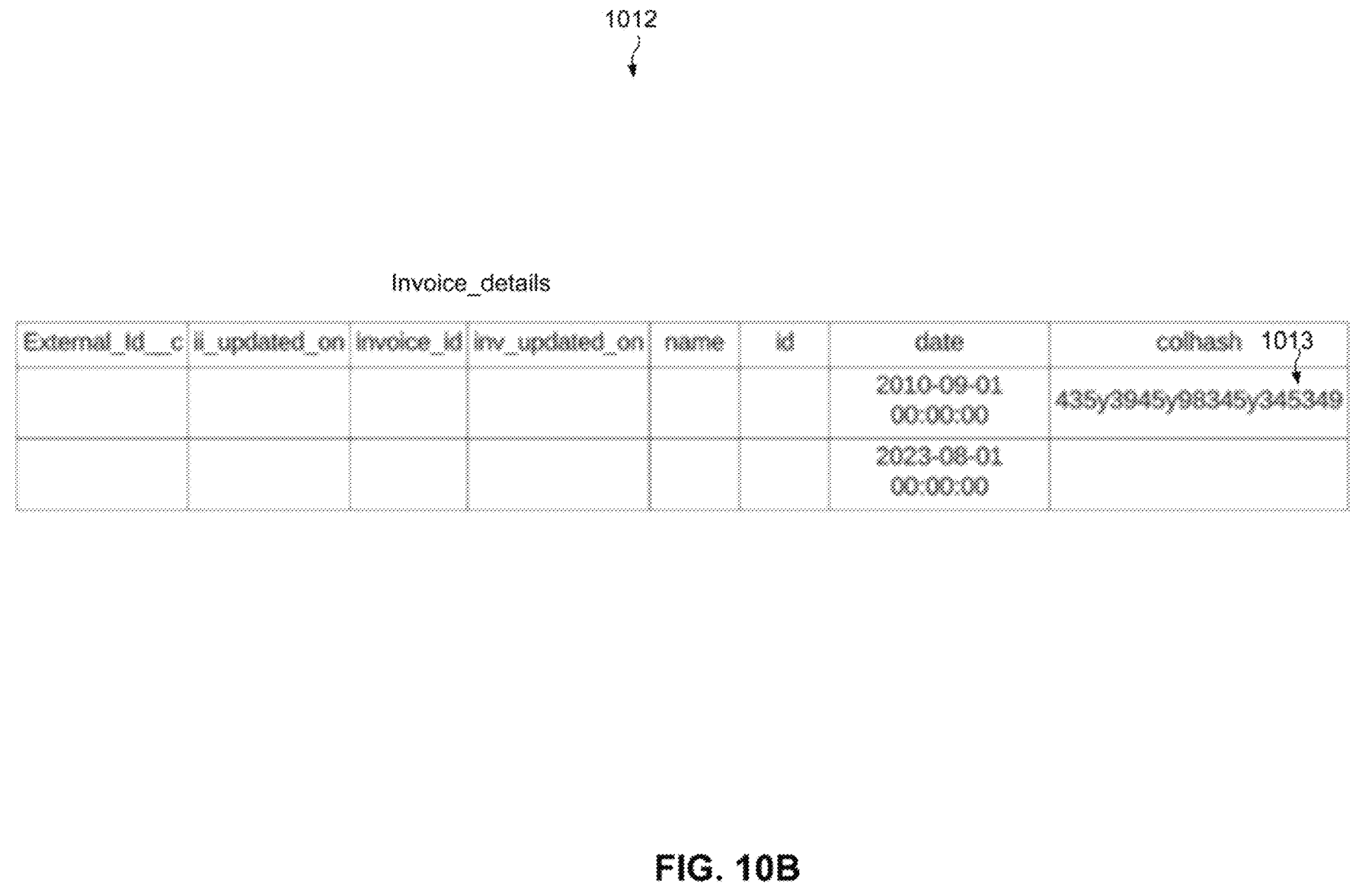

| invoice_details | | | | | | |
|---|---|---|---|---|---|---|
| external_id_c1_updated_on | invoice_id | inv_updated_on | name | id | date | cdlhash  1013 |
| | | | | | 2010-09-01 00:00:00 | 43sy9p45yhrsa8y3x53ss0 |
| | | | | | 2023-09-01 00:00:00 | |

FIG. 10B

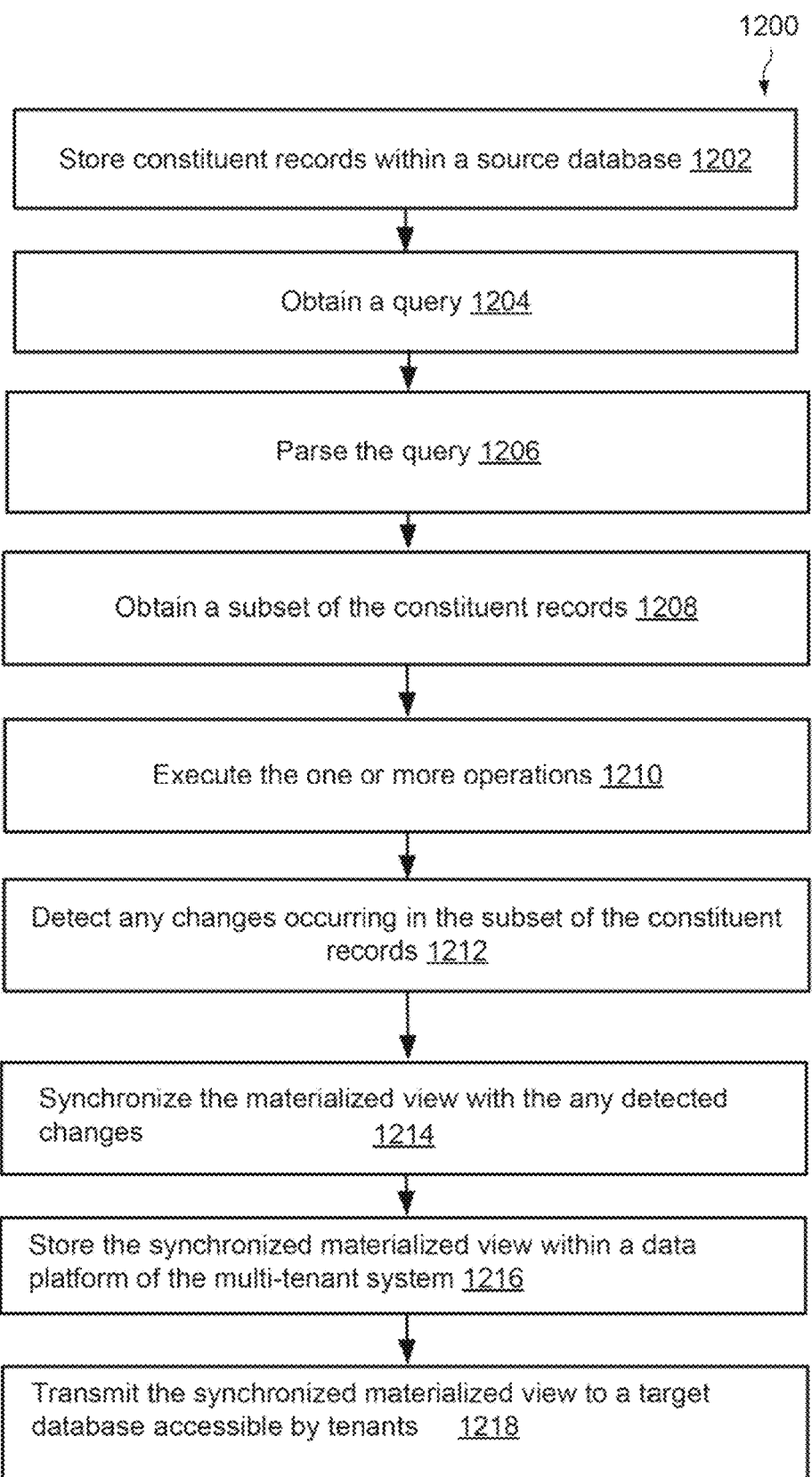

1200

Store constituent records within a source database 1202

Obtain a query 1204

Parse the query 1206

Obtain a subset of the constituent records 1208

Execute the one or more operations 1210

Detect any changes occurring in the subset of the constituent records 1212

Synchronize the materialized view with the any detected changes                     1214

Store the synchronized materialized view within a data platform of the multi-tenant system 1216

Transmit the synchronized materialized view to a target database accessible by tenants     1218

FIG. 12

SYSTEMS AND METHODS FOR GENERATING AND SYNCHRONIZING MATERIALIZED VIEWS

TECHNICAL FIELD

This disclosure pertains to generating data representations by performing operations on constituent data within different data sources and synchronizing the data representations to be consistent with changes in the constituent data, in multi-tenant computing systems. More specifically, this disclosure pertains to incrementally maintaining materialized views that result from operations such as join operations on tables.

BACKGROUND

Much of available data is stored in data structures such as tables. Performing operations on such data to generate materialized views and incrementally updating the materialized views remains a bottleneck, limiting the ability to leverage and harness such data. In particular, challenges exist in efficiently and accurately synchronizing materialized views with changes in the constituent data that was used to generate the materialized views.

SUMMARY

A claimed solution rooted in computer technology overcomes problems specifically arising in the realm of computer technology.

Embodiments of the invention include a computing system that confers a multitude of advantages. These advantages include 1) performing of incremental updates within a materialized view; 2) incremental maintenance of watermarks using one or more columns in a query backing the materialized view; 3) augmenting the Structured Query Language (SQL) to annotate an SQL statement, for example, to capture watermark columns; 4) performing materialization of deleted rows using sequences of SQL queries; 5) capturing long-running transactions; and 6) performing duplicate elimination using primary keys in the table maintaining the materialized view.

A materialized view may encompass stored or persisted results of a query. Here, these results may include or refer to modified, added, or deleted records resulting from a transaction or task (hereinafter "transaction") performed on one or more tables. Alternatively, these results may include or refer to an extraction, retrieval, or selection (hereinafter "selection") of certain data, rows, entries, or records (hereinafter "records") from the one or more tables. To illustrate a specific example, the selection of records may be restricted to those that start after a particular watermark, which may indicate a timestamp.

Incremental updates are performed due to incremental maintenance of watermarks using one or more columns in a query backing, or resulting in, the materialized view. In some examples, the watermarks record and/or track states of one or more tables. A watermark changes in value to indicate that a record within a row has been modified. Therefore, the computing system performs incremental updates by retrieving only the records within rows that correspond to watermarks that have changed since a most recent previous update.

In some embodiments, queries may be defined and processed using SQL. The SQL, or a particular dialect of SQL (e.g., MySQL) may be augmented to annotate an SQL statement to capture one or more columns corresponding to the watermarks, or the watermark columns. In other examples, the SQL may be augmented to annotate SQL statements containing primary key columns, indices and/or query conditions. In some examples, an "@" symbol within a SQL statement indicates an annotation.

In some embodiments, the materialization of deleted rows may entail a sequence of SQL queries. In some examples, the SQL queries may include a soft deletion prior to a hard deletion.

In some embodiments, the incremental updates may be further enhanced to capture long-running transactions and/or perform duplicate elimination. For example, if an initial query failed to capture updates from long-running transactions, the computing system may run or execute a subsequent query to capture any updates from previously uncaptured long-running transactions. The subsequent query may be executed to capture any transactions having a start time earlier than a watermark of the initial query. In some examples, the computing system may execute a subsequent query according to a start time of MIN(MAX(currently retrieving incremental results), MIN(long-running transactions)). In other words, the computing system first determines an earliest start time of any uncaptured long-running transactions. Next, the computing system determines a latest watermark out of all the results, or updates, being incrementally retrieved. Next, the computing system determines an earliest time of the previous two determinations. For example, if any uncaptured long-running transactions started prior to a time corresponding to the latest watermark, then the computing system executes a subsequent query according to an earliest start time of any uncaptured long-running transactions.

Meanwhile, the duplicate elimination may deduplicate or remove records corresponding to updates that were previously captured. The duplicate elimination may be performed via primary keys in a table maintaining the materialized view. For example, the duplicate elimination may remove any records corresponding to updates of the subsequent query that were already captured by the initial query, such as records captured from incremental updates of non-long-running transactions.

Embodiments of the invention enable generating of a representation of data by performing an operation across data within multiple constituent data structures, such as a join operation across multiple tables. This representation of data may include a materialized view, and facilitates compatibility with downstream processes, thereby reducing downstream processing time. Additionally, according to embodiments of the invention, when any entries, such as rows, of a constituent data structure change, the representation of data is seamlessly and accurately synchronized to be consistent with the changes in the entries of the constituent data structure. This results in an assurance that the representation of data is accurate and up-to-date. Embodiments of the invention provide greater scalability and performance even when the operation involves large data sizes of the constituent data structures. Most current implementations, in contrast, fail to efficiently and accurately capture all such changes when attempting to synchronize a representation, for example, involving join operations. For example, one roadblock with current implementations is that they require regenerating an entire representation, including any entries in the constituent data structure that remain unchanged. This process results in delays, inefficient utilization of computing resources, and redundant or duplicate data. The redundant data may further require large-scale scans and rewrites that consume computing resources and time, sometimes causing delays of over 12 hours. Another problem is a limitation in a number of rows per table that can be read and/or queried, for example, one million rows per table. Therefore, if the data size exceeds this limitation, then multiple separate reads are required, which results in further delays and inefficiencies. Moreover, in some current implementations, certain transactions, such as long-running transactions, may be undetected and thus fail to be synchronized with the representation.

Embodiments of the invention implement a multi-tenant system, comprising a source database configured to store constituent records. The multi-tenant system includes one or more hardware processors; and memory storing computer instructions. The computer instructions, when executed by the one or more hardware processors, are configured to perform obtaining a query. The query comprises statements defining one or more operations, tasks, jobs, executions, or transactions (hereinafter "transactions") to be performed on a subset of the constituent records referred to within the statements. The computer instructions when executed by the one or more hardware processors are further configured to perform parsing the query to decipher a type of the one or more operations, and the subset of the constituent records referred to within the statements. The computer instructions when executed by the one or more hardware processors are further configured to perform obtaining the subset of the constituent records from the parsed query from the source database, wherein the subset of the constituent records comprises normalized data from separate data structures. The computer instructions when executed by the one or more hardware processors are further configured to perform executing the one or more operations, wherein the execution of the one or more operations generates a materialized view that denormalizes the data. The computer instructions when executed by the one or more hardware processors are further configured to perform detecting any changes occurring in the subset of the constituent records, synchronizing the materialized view with the any detected changes, storing the synchronized materialized view within a data platform of the multi-tenant database, and transmitting the synchronized materialized view to a target database accessible by tenants.

In some embodiments, the one or more operations may comprise a join operation.

In some embodiments, the detecting of any changes may comprise detecting an addition, a deletion, or a modification to existing data in the subset of the constituent records.

In some embodiments, the detecting of any changes may comprise detecting a deletion; and the detecting of the deletion may comprise detecting an indication that a row or a portion of a row is scheduled to be deleted.

In some embodiments, the detecting of any changes may comprise detecting an update to a watermark corresponding to one or more rows of the subset of the constituent records; and the update to the watermark may comprise a monotonic increase in a value of the watermark beyond a highest value of a previous watermark in a most recent generation or synchronization of the materialized view.

In some embodiments, the detecting of any changes may comprise detecting an update to a watermark corresponding to one or more rows of the subset of the constituent records. The watermark may comprise a timestamp, and the update to the watermark may comprise an update to the timestamp, the updated timestamp indicating a time later than a latest time of a previous watermark in a most recent generation or synchronization of the materialized view.

In some embodiments, the detecting any changes occurring in the subset of the constituent records may comprise detecting a first change in a first record, the first record being changed by a first transaction having a first starting time and being confirmed at a first ending time. In some embodiments, the computer instructions may be further configured to perform detecting an unconfirmed second change in a second record, the second record being changed by a second transaction having a second starting time, the second starting time being before the first starting time. In some embodiments, the computer instructions may be further configured to perform, in response to detecting the unconfirmed second change, refraining from updating a watermark corresponding to the first record. In some embodiments, the computer instructions may be further configured to perform, refraining from synchronizing the first change with the materialized view until the unconfirmed second change has been confirmed.

In some embodiments, the detecting any changes occurring in the subset of the constituent records may comprise detecting a first change in a first record, the first record being changed by a first transaction having a first starting time and being confirmed at a first ending time. In some embodiments, the computer instructions may further be configured to perform detecting an absence of any unconfirmed changes in other records that have a starting time before the first starting time in response to detecting an absence of any unconfirmed changes in other records that have a starting time before the first starting time, updating a watermark corresponding to the first record; and synchronizing the first change with the materialized view.

In some embodiments, the parsing of the query may comprise deciphering a primary key of a first table and a foreign key of a second table to be joined.

In some embodiments, the data platform may compare a most updated iteration of the materialized view within the target database with a most updated iteration of the materialized view within the data platform, determine whether the most updated iteration of the materialized view within the target database matches the most updated iteration of the materialized view within the data platform, and in response to determining that the most updated iteration of the materialized view fails to match the most updated iteration of the materialized view within the data platform, transmit the most updated iteration of the materialized view within the data platform to the target database.

In some embodiments, the data platform may comprise a row-major relational database to store the synchronized materialized view.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 4 is a block diagram illustrating details of the materialized view synchronizing engine, which synchronizes the view with any changes in the constituent data sources, in accordance with some embodiments of the present invention.

FIGS. 5A and 5B, 6-8, and 9A and 9B are diagrams that further illustrate details of performing an operation across constituent data sources to generate a view (e.g., a materialized view) and synchronizing the view with any changes in the constituent data sources, according to some embodiments of the present invention.

FIGS. 5A and 5B are diagrams that illustrate details of obtaining a query, parsing the query, and generating a materialized view according to processing of the query, according to some embodiments of the present invention.

FIG. 6 is a diagram that illustrates details of synchronizing a materialized view according to new or added entries within constituent data sources, according to some embodiments of the present invention.

FIG. 7 is a diagram that illustrates details of synchronizing a materialized view according to entries scheduled for deletion from the constituent data sources, according to some embodiments of the present invention.

FIG. 8 is a diagram that illustrates details of synchronizing a materialized view according to modifications of entries in the constituent data sources, according to some embodiments of the present invention.

FIGS. 9A and 9B are diagrams that illustrate details of synchronizing a long-running transaction, in which a first transaction in a first entry of a constituent table commences prior to a second transaction in a second entry of the constituent table, but the first transaction is confirmed after the second transaction is confirmed, according to some embodiments of the present invention.

FIGS. 10A and 10B are diagrams that illustrate a join operation involving more than two tables, according to some embodiments of the present invention.

FIG. 12 is a flowchart illustrating details of a method of performing an operation across constituent data sources to generate a view (e.g., a materialized view) and synchronizing the view with any changes in the constituent data sources, according to some embodiments of the present invention.

DETAILED DESCRIPTION

Figure 1:
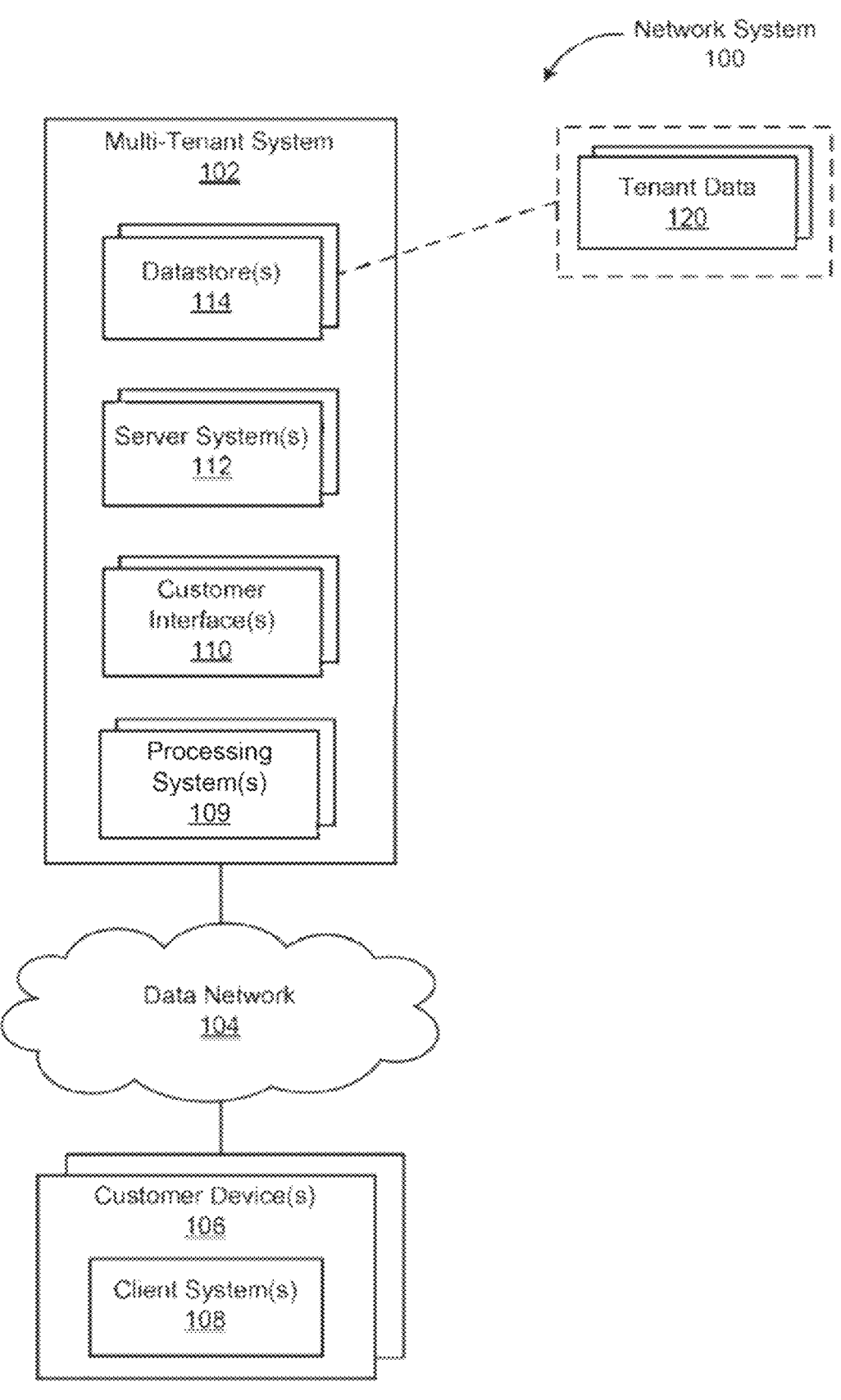
FIG. 1 is a block diagram of a network system for providing cloud-based software-as-a-service (SAAS) services of a multi-tenant system to multiple tenants, according to some embodiments of the present invention.

A claimed solution rooted in computer technology overcomes problems specifically arising in the realm of computer technology.

Embodiments of the invention include a computing system that confers a multitude of advantages. These advantages include 1) performing of incremental updates within a materialized view; 2) incremental maintenance of watermarks using one or more columns in a query backing the materialized view; 3) augmenting the Structured Query Language (SQL) to annotate an SQL statement, for example, to capture watermark columns; 4) performing materialization of deleted rows using sequences of SQL queries; 5) capturing long-running transactions; and 6) performing duplicate elimination using primary keys in the table maintaining the materialized view.

A materialized view may encompass stored or persisted results of a query. Here, these results may include or refer to modified, added, or deleted records resulting from a transaction or task (hereinafter "transaction") performed on one or more tables. Alternatively, these results may include or refer to an extraction, retrieval, or selection (hereinafter "selection") of certain data, rows, entries, or records (hereinafter "records") from the one or more tables. To illustrate a specific example, the selection of records may be restricted to those that start after a particular watermark, which may indicate a timestamp.

Incremental updates are performed due to incremental maintenance of watermarks using one or more columns in a query backing, or resulting in, the materialized view. In some examples, the watermarks record and/or track states of one or more tables. A watermark changes in value to indicate that a record within a row has been modified. Therefore, the computing system performs incremental updates by retrieving only the records within rows that correspond to watermarks that have changed since a most recent previous update. The concept of incremental maintenance of watermarks is further illustrated in FIG. 3B.

In some embodiments, queries may be defined and processed using SQL. The SQL, or a particular dialect of SQL (e.g., MySQL) may be augmented to annotate an SQL statement to capture one or more columns corresponding to the watermarks, or the watermark columns. In other examples, the SQL may be augmented to annotate SQL statements containing primary key columns, indices and/or query conditions. In some examples, an "@" symbol within a SQL statement indicates an annotation. Annotations are further illustrated in FIG. 10A within a query 1010. For example, "@track(inv_updated_on, timestamp)," "@track (ii_updated_on, timestamp), and "@timestamp" are annotations of SQL statements containing watermark columns. As other examples, "@pk(1)," and "@pk(2) are annotations of SQL statements containing primary key columns.

In some embodiments, the materialization of deleted rows may entail a sequence of SQL queries. In some examples, the SQL queries may include a soft deletion prior to a hard deletion.

In some embodiments, the incremental updates may be further enhanced to capture long-running transactions and/or perform duplicate elimination. For example, if an initial query failed to capture updates from long-running transactions, the computing system may run or execute a subsequent query to capture any updates from previously uncaptured long-running transactions. The subsequent query may be executed to capture any transactions having a start time earlier than a watermark of the initial query. In some examples, the computing system may execute a subsequent query according to a start time of MIN(MAX(Currently retrieving incremental results), MIN(long-running transactions)). In other words, the computing system first determines an earliest start time of any uncaptured long-running transactions. Next, the computing system determines a latest watermark out of all the results, or updates, being incrementally retrieved. Next, the computing system determines an earliest time of the previous two determinations. For example, if any uncaptured long-running transactions started prior to a time corresponding to the latest watermark, then the computing system executes a subsequent query according to an earliest start time of any uncaptured long-running transactions.

Meanwhile, the duplicate elimination may deduplicate or remove records corresponding to updates that were previously captured. The duplicate elimination may be performed via primary keys in a table maintaining the materialized view. For example, the duplicate elimination may remove any records corresponding to updates of the subsequent query that were already captured by the initial query, such as records captured from incremental updates of non long-running transactions. The concepts of capturing long-running transactions and duplicate elimination are further illustrated in FIG. 3C.

Embodiments of the invention implement one or more computing systems (e.g., multi-tenant computing systems) that perform generating and/or representing (hereinafter "representing") data by performing one or more operations or transformations (hereinafter "operations") across multiple constituent data sources or entities (hereinafter "sources"). The multiple constituent data sources may include data structures such as dataframes, arrays, and/or tables. The one or more computing systems further perform a subsequent updating, maintenance, and/or synchronizing (hereinafter "synchronizing") of the representation of data to be consistent with changes or mutations (hereinafter "changes") of any entries from the multiple constituent sources. These implementations resolve a current limitation of data processing and synchronization involving operations across different data sources. For example, these implementations obviate a need to regenerate the representations every time data from the multiple constituent sources is changed. These implementations also capture, within the synchronizing, data transactions or processes that may have previously been overlooked, such as long-running transactions. These implementations also scale efficiency even when the constituent data sources are of large size, such as millions of entries. Moreover, these implementations provide more flexibility in generating a representation of data to be compatible with certain downstream operations, thereby reducing downstream processing times.

In some embodiments, the representing of data may encompass performing an operation across constituent data sources and generating a representation of a view, result, or manifestation (hereinafter "view") of the operation. The view may include a materialized view. In some embodiments, the operation includes a join operation across the constituent data sources, such as tables. In these embodiments, the materialized view may include a joined table.

However, the representing of data is not to be construed as being limited to join operations and/or on tables. For example, the operation may include a filtering operation, a formatting operation, a condensing operation, and/or other applicable processing operation.

In a scenario of a join operation, the constituent tables to be joined may include normalized tables (e.g., supernormalized tables). The constituent tables may include watermarks, timestamps, or incrementing keys or indices (hereinafter "watermarks"). The watermarks may indicate most recent updated times or time stamps (hereinafter "times") corresponding to the entries or records (hereinafter "entries") or of rows of the constituent tables. Updates in the timestamps indicate when any entries within the constituent tables have been changed, and when the representation of data needs to be synchronized to be consistent with the changed entries in the constituent tables.

An operation to be performed may be defined by a query. The query may be defined according to programming languages such as Structured Query Language (SQL), and/or operated within databases such as a MySQL database. The query may include a set of statements or commands (hereinafter "statements"). The one or more computing systems may parse the query to analyze the set of statements, and convert the set of statements into a plan, scheme, arrangement, blueprint, or schedule (hereinafter "plan") to perform or execute the join operation. The parsing of the query may encompass deciphering a type of the operation, the subset of the constituent records referred to within the statement (e.g., specific columns of specific tables), any primary and/or foreign keys, and one or more other conditions of the one or more operations such as conditions regarding one or more watermarks.

A join operation may include any or all of an inner join, a left inner join, a left outer join, a right inner join, a right outer join, and an outer join. Execution of the join operation may generate a denormalized and materialized (hereinafter "materialized") view. This view may also include watermarks. The watermarks may indicate most recent updated times corresponding to the entries of rows of the materialized view. In some examples, the materialized view, additionally or alternatively, includes a hash of a combination of different primary keys, or a combination of a primary key and a foreign key as a means of authenticating or verifying constituent data sources used to obtain the materialized view. Such a denormalized representation may facilitate integration with one or more external downstream systems, which may be compatible with denormalized representations.

Meanwhile, the synchronization of the materialized view may be according to any changes, such as additions, deletions, and/or modifications to the entries in the constituent data sources. For example, the synchronizing of the representation may include detecting a change in an entry of a constituent data source, recording the change, updating or incrementing (hereinafter "updating") a watermark corresponding to the entry, updating a corresponding entry of the materialized view to be consistent with any changes in the constituent data sources, and updating a watermark within the materialized view, if such a watermark is present.

The synchronization of the materialized view may include resolving and accounting for any entries of a constituent table undergoing long-running transactions. In some implementations, long-running transactions include any modifications to entries that consume at least a threshold duration of time. For example, if a first transaction constitutes a long-running transaction, the first transaction may commence prior to a second transaction, but may be committed or confirmed after the second transaction is committed or confirmed. These long-running transactions may previously have been missed when synchronizing the materialized view.

In some examples, to prevent the long-running transactions from being missed, watermarks that correspond to the first transaction and the second transaction may not be updated until completion of the long-running transaction. In some examples, results of any updated transactions, such as the second transaction, once confirmed, may be updated into a respective entry of a constituent data source, but the watermark may not reflect the confirmed transaction until the first transaction is confirmed. The computing system may capture any pending long-running transactions in a subsequent step, for example, by running a subsequent query to capture any records correspond to the long-running transactions. Those records may correspond to earlier timestamps compared to the watermark. In such a manner, the computing system may ensure retrieving or capturing of any long-running transactions, rather than missing them when synchronizing the materialized view.

In contrast, if the watermark corresponding to the second transaction were updated before the first transaction confirmed, then the second transaction would be synchronized with the materialized view, but a subsequent synchronization may fail to catch the first transaction when the first transaction is confirmed later, because the first transaction, once confirmed, would have a smaller value watermark, or an earlier watermark, compared to the second transaction. This is because, in some examples, the watermarks indicate a start time of a transaction and not an end time or confirmation time. Also, the iterative synchronization only captures watermarks that have higher values or later times compared to a previous synchronization.

FIG. 1 depicts a diagram of an example network system 100 for providing cloud-based software-as-a-service (SAAS) services of a multi-tenant system 102 to multiple tenants according to some embodiments. Examples of the cloud-based SAAS services include data storage, data processing, and business-oriented applications. In some embodiments, each tenant may be a subscription-based entity or provider (e.g., an internet service provider, a home security system and service provider, a cellular phone service provider, or entertainment content provider). Each tenant may include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, datastores 114, and processing systems 109. Each of the client devices 106 includes a client system 108 that accesses the cloud-based SAAS services hosted by the multi-tenant system 102. In some embodiments, the client systems 108 may be operated by employees (e.g., administrator users) of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, each tenant may be associated with a subset of the total tenant interfaces 110 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 112 may support load balancing when multiple tenants (and/or multiple customers of tenants) try to access the multi-tenant system 102 concurrently. Further, in some embodiments, each tenant may be associated with a subset of the total server systems 112 for load balancing. In some embodiments, the processing systems 109 include hardware, software and/or firmware to perform generating a materialized view that results from an operation across constituent data from different sources within the datastores 114, and synchronizing the materialized view with any changes in the constituent data, as will be elucidated in the subsequent figures.

In some embodiments, tenant data 120 for each tenant may be stored in a logical store across one or more datastores 114. In some embodiments, each tenant uses a logical store that is not assigned to any predetermined datastores 114. Each logical store may contain tenant data 120 that is used, generated and/or stored as part of providing tenant-specific business services or functions. In some embodiments, the datastores 114 may include relational database management systems (RDBMS), object-based database systems, and/or the like. In some embodiments, tenant data 120 may be stored across multiple datastores 114, with each datastore dedicated to a particular service (e.g., managing customer records, managing subscription data, managing product and/or service consumption information, managing billing information, managing payment information, and/or the like). In some embodiments, any of the datastores 114 may store information regarding any constituent data and/or one or more materialized views.

In some embodiments, the datastores 114 may include MySQL relational database systems. One advantage of such a relational database system includes redo-logs that are generated once the processing systems 109 generate a materialized view. The redo-logs may be used to move those materialized views into a columnar layout in a downstream warehouse. This is an improvement over an alternative implementation in which the materialized views are maintained directly within the warehouse. In this alternative implementation, the views would need to be queried for from constituent tables, which means that watermarks would also need to be stored within the warehouse, thereby consuming additional data resources.

In some embodiments, the tenant data 120 may include subscription data, such as billing data, subscription status (e.g., active, canceled, suspended, re-activated), and/or geospatial data. Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity may include usage of a product and/or product of a subscriber (e.g., what channels the subscriber actually watches, what services and what level of consumption the subscriber receives, quality of the product and/or services, and/or the like).

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

In some embodiments, the tenant data 120 may be stored in one or more monolithic databases and in one or more custom field databases. As stated above, the tenant data 120 may be stored in different records, e.g., a subscription record, a usage record, a billing record, etc. Each record may be managed by a particular record object, e.g., a subscription record object, a usage record object, a billing record object, etc. Each record object may manage a number of global fields that are common to all of the tenants. For example, the global fields for a subscription record for each and every tenant may include record ID, a username, a subscription identifier, etc. The global fields may be stored in the monolithic database. Notably, different tenants may require different additional fields to store information for different record objects. For example, a first tenant may require two custom fields for a subscription record and one custom field for a usage record. Another tenant may require three custom fields for a subscription record and four custom fields for a usage record. Data for these custom fields can be stored in a custom field database for each record for each tenant.

The monolithic and custom field databases of the multitenant system 102 may manage (e.g., create, read, update, delete) tenant data 120 using different formats, different protocols, etc. A monolithic application will control data storage in the monolithic database. A custom field service (microservice) will control data storage in the custom field database. It will be appreciated that as used herein, a "service" may be single service and/or a set of services (e.g., a cluster of services).

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2:
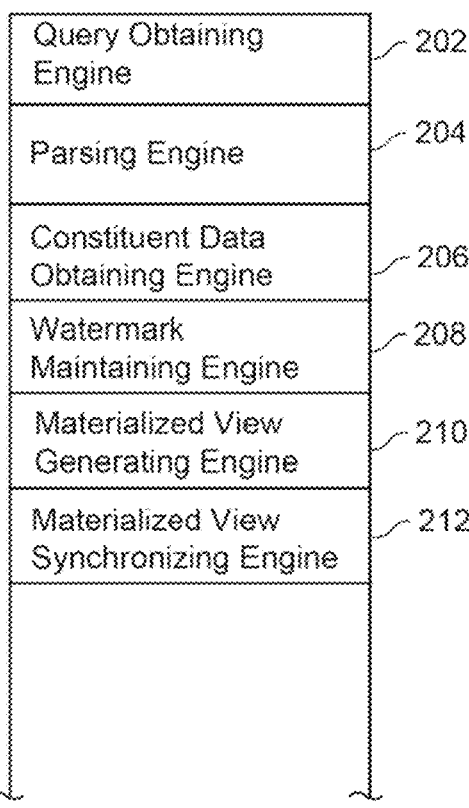
FIG. 2 is a block diagram illustrating details of the server systems, which may perform an operation across constituent data sources to generate a view (e.g., a materialized view) and synchronizes the view with any changes in the constituent data sources, according to some embodiments of the present invention.

FIG. 2 is a block diagram illustrating details of the processing systems 109, in accordance with some embodiments of the present invention. The processing systems 109 include a query obtaining engine 202, a parsing engine 204, a constituent data obtaining engine 206, a watermark maintaining engine 208, a materialized view generating engine 210, and a materialized view synchronizing engine 212. Any of the aforementioned engines as well as engines described subsequently may be capable of using any communication protocol, communication format, encryption, decryption, error correction, load balancing, etc., and may include one or more APIs.

The query obtaining engine 202 includes hardware, software and/or firmware capable of communicating with the tenant interfaces 110, the customer devices 106, and/or other computing interfaces or APIs, to obtain a query. A query may include statements that define a view. The query may indicate one or more operations to be performed over different data sources, such as a join operation to be performed across different data sources. The query may further indicate specific parameters, attributes, and/or characteristics (hereinafter "characteristics") of the one or more operations, such as specific tables, objects, and/or columns to be joined, a type of operation to be performed, any primary and foreign keys, and/or one or more other restrictions such as a "start from" condition that indicates a minimum watermark value from which synchronization is performed. In some examples, the query may include an annotation of one or more columns in a project list of a statement such as a SQL statement. The purpose of this annotation may be to reference certain columns in subsequent runs or iterations, as will be described with respect to the constituent data obtaining engine 206. The statements may be written according to different programming languages such as SQL, for example, PrestoSQL.

The parsing engine 204 includes hardware, software and/or firmware capable of parsing the query obtained by the query obtaining engine 202. When parsing the query, the parsing engine 204 may convert the query into a plan to perform or execute an operation, such as a join operation. The parsing of the query may include, identifying the characteristics of the operation, the columns to be joined, the type of operation to be performed, any primary and foreign keys, and/or the one or more other restrictions.

The constituent data obtaining engine 206 includes hardware, software and/or firmware capable of obtaining, from the datastores 114, constituent data upon which operations are to be performed. The constituent data obtaining engine 206 may specifically obtain constituent data that matches the columns or objects deciphered within the query from the parsing engine 204. The constituent data may include normalized data, such as tables and/or objects. In some embodiments, depending on whether the query names or references (hereinafter "names") only one table or multiple tables, the constituent data obtaining engine 206 may execute different workflows or tasks (hereinafter "tasks"). Specifically, if the query names only one table, then the constituent data obtaining engine 206 may transmit a request to a metadata service to determine whether the table is located in a first datastore. If the table is located in the first datastore, then the constituent data obtaining engine 206 may forward the query to, or employ, the metadata service or a different metadata service in order to obtain the constituent data. The first datastore may include a column-oriented, distributed datastore. However, if the query names multiple tables, or if the table is not located in the first datastore, then the constituent data obtaining engine 206 may forward the query to, or employ, a distributed query processor that aggregates data from multiple sources. This distributed query processor may call an interface, such as a serial peripheral interface (SPI), to obtain metadata for the table. The metadata for the table may include contextual information, for example, regarding a type of information within the table. If the type of information is transactional, the distributed query processor may route the query via a sidecar container of a pod, which may link to a datastore (e.g., one of the datastores 114) that houses the constituent data, or generate a computing call to obtain a definition of the view. Using the definition of the view, the distributed query processor may query the one or more datastores. If the type of information is non-transactional, then the distributed query processor may retrieve the data from one or more sources.

The constituent data obtaining engine 206 may read rows from the datastores 114, and write the rows into a different storage or cache, such as ground truth platform 1107 of FIG.

11. The reading process may be part of an input queue, which includes issuing a query to the datastores 114 for the constituent data. The constituent data obtaining engine 206 may utilize a pipelining mechanism to parallelize reads and writes. Because the writes typically take longer than the reads, the constituent data obtaining engine 206 utilizes a queue based pipelining mechanism, which involves a collection of stages, each of which is allocated a number of threads. The constituent data obtaining engine 206 may control a number of threads at each stage in a granular fashion, and/or a fetch size of the constituent data. The threads may include Java threads. These threads may obtain requests from an input queue, perform a task, and write them into an output queue. For every number of rows retrieved, such as every 50,000 rows retrieved, the constituent data obtaining engine 206 creates a packet and sends the packet to an output queue, which corresponds to the writing of the rows into a different storage or cache. The writing of the threads may occur via using a load data local infile command, which is a fast writing process, or alternatively, by using other prepared statements, which may be a slower process. The input queue and/or the output queue can be in-memory, on local-disk, or within a cluster, such as a Kafka cluster which provides durability guarantees. Inserts into the input queue and/or the output queue adhere to configurable throttles to avoid exceeding size restrictions. If a queue resides on a local-disk, memory mapped files are used to store and process these queues.

Additionally, the pipelining mechanism permits jobs within queues to be restartable following an interruption or shutdown. The pipelining mechanism tracks any work-items if queues are marked as being on local-disk or within a cluster. A given pipelining mechanism may also have queues that are in-memory and others that are on local-disk. The local disk queues may be restarted in an event of a server crash, meaning that any partial work done is not wasted. The pipelining mechanism also permits pipelines for different tenants to be executed in different machines. Therefore, during high loads, the pipelining mechanism may adaptively increase a number of machines to be employed.

As the constituent data obtaining engine 206 scans through retrieved rows from a source database (e.g., source database 1102, or the datastores 114), the constituent data obtaining engine may write certain entries, such as annotated columns, to a key-value store. These entries may be referenced during subsequent runs or iterations. For example, the constituent data obtaining engine 206 may record maximum values of annotated columns, such as maximum values of watermarks. By recording these maximum values, subsequent iterations of synchronizing a materialized view may refer to these maximum values. In particular, subsequent iterations may capture only rows corresponding to watermarks that exceed these maximum values.

The watermark maintaining engine 208 includes hardware, software and/or firmware capable of generating and/or maintaining a watermark on the constituent data in order to track any changes (e.g., modifications, additions, and/or deletions) to the constituent data. In some examples, the watermark may include a timestamp, and/or incrementing keys or indices such as a monotonically increasing value. The watermark may correspond to a particular column of a table of the constituent data and/or an entire table of the constituent data. Upon ingestion or importation (hereinafter "importation") of a constituent table into the datastores 114, the watermark maintaining engine 208 may add or populate (hereinafter "add") a watermark into the table, into a particular column of the table, if no watermark is already present. Initially, the watermark may correspond to a time at which the constituent tables were imported. Alternatively, if watermarks already exist within a constituent table, the watermark maintaining engine 208 may refrain from adding a watermark column.

Upon receiving an indication, or detecting that, a particular row of the table has changed, the watermark maintaining engine 208 may selectively update the watermark by either updating a timestamp or monotonically increasing a most recent value of the watermark. For example, the watermark maintaining engine 208 may receive an indication or detect such a change via a Change Data Capture (CDC) pipeline, which may further include one or more event listeners, such as a binary log listener. The selective updating will be described further in FIG. 3A.

The materialized view generating engine 210 includes hardware, software and/or firmware capable of generating one or more materialized views from the constituent data. In some embodiments, the materialized view generating engine 210 may obtain the plan for generating the one or more materialized views from the parsing engine 204, and the constituent data on which operations are to be performed, from the constituent data obtaining engine 206. The materialized view generating engine 210 may execute the plan, for example, by executing any join operations upon the constituent data sources. The materialized view generating engine 210 may store one or more resulting materialized views within a database of the datastores 114. In some examples, the database may include a row-major relational database. The database may be part of a ground truth platform (e.g., illustrated in FIG. 11), which may distribute the one or more materialized views to a target database associated with a particular tenant.

Initially, the materialized view generating engine 210 may generate a full snapshot, for example, resulting from a join operation performed on the constituent data, without using watermarks. Periodically, the materialized view generating engine 210 may perform rehydration, reconciliation, or verification (hereinafter "verification") for error checking purposes by generating a full snapshot which includes regenerating an entirety of the constituent data, without using watermarks, during a rehydration mode. The rehydration mode is opposed to an iterative or a synchronization mode employed by the materialized view synchronizing engine 212, which requires checking of watermark values.

The materialized view synchronizing engine 212 includes hardware, software and/or firmware capable of synchronizing the one or more materialized views generated by the materialized view generating engine 210. In some examples, the synchronizing may include incrementally updating the one or more materialized views according to any updates or changes (hereinafter "changes") in the constituent data. The changes may include any additions, deletions, and/or modifications to existing data. In some examples, the synchronizing may include updating the one or more materialized views according to any updates in the query itself. For example, the updates in the query may include a change of a primary key, a foreign key, and/or other characteristics of an operation (e.g., a join operation) to be performed on the constituent data.

The synchronizing according to any dates in the constituent data may be represented according an expression: $(T \cup \Delta T) \bowtie (S \cup \Delta S) = (T \bowtie S) \cup (\Delta T \bowtie S) \cup (T \bowtie \Delta S) \cup (\Delta T \bowtie \Delta S)$, in which the $\Delta T$ includes any rows added to, removed from, and/or modified compared to a constituent table T, and $\Delta S$ includes any rows added to, removed from, and/or modified compared to a constituent table S, $\cup$ represents a union operator, and $\bowtie$ represents a join operation (e.g., an inner join operation). In this expression, the incremental updates are represented by $(\Delta T \bowtie S) \cup (T \bowtie \Delta S) \cup (\Delta T \bowtie \Delta S)$, whereas $(T \bowtie S)$ represents the obtained one or more materialized views by the materialized view generating engine 210. Thus, the materialized view synchronizing engine 212 may obtain updates according to $(\Delta T \bowtie S) \cup (T \bowtie \Delta S) \cup (\Delta T \bowtie \Delta S)$. The materialized view synchronizing engine 212 may detect any changes to the constituent tables based on updates in watermarks compared to a previous, most recent iteration of the materialized views. Upon detecting the changes to the constituent tables, the materialized view synchronizing engine 212 may modify the materialized views accordingly. The materialized view synchronizing engine 212 may also synchronize any modified materialized views with other dependent materialized views.

Figure 11:
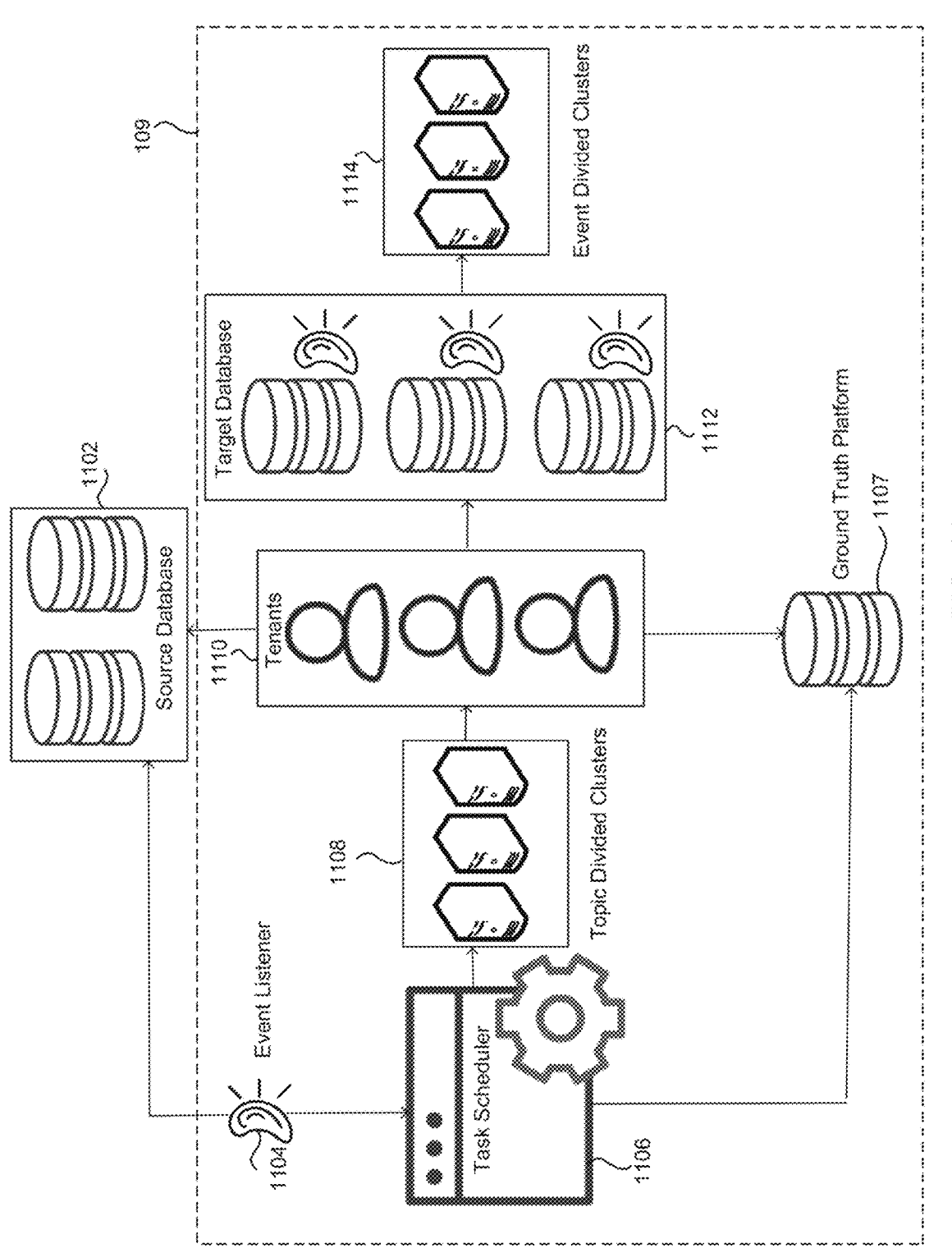
FIG. 11 is a diagram that further illustrates an exemplary architecture of a multi-tenant system, according to some embodiments of the present invention.

The materialized view synchronizing engine 212 may further store any updated materialized view within a ground truth database or platform (hereinafter "ground truth platform"), as illustrated in FIG. 11. In some examples, the ground truth platform may pass any updates to the materialized views to the target database, and/or track a latest version or update of materialized views received by the target database. In such a manner, the ground truth platform may intelligently become aware whether the target database has a most updated version of the materialized views, and upon detecting that the target database does not have a most updated version of the materialized views, transmit the most updated version to the target database when the target database is connected. Further details of the materialized view synchronizing engine 212 will be provided in FIG. 4.

Figure 3A:
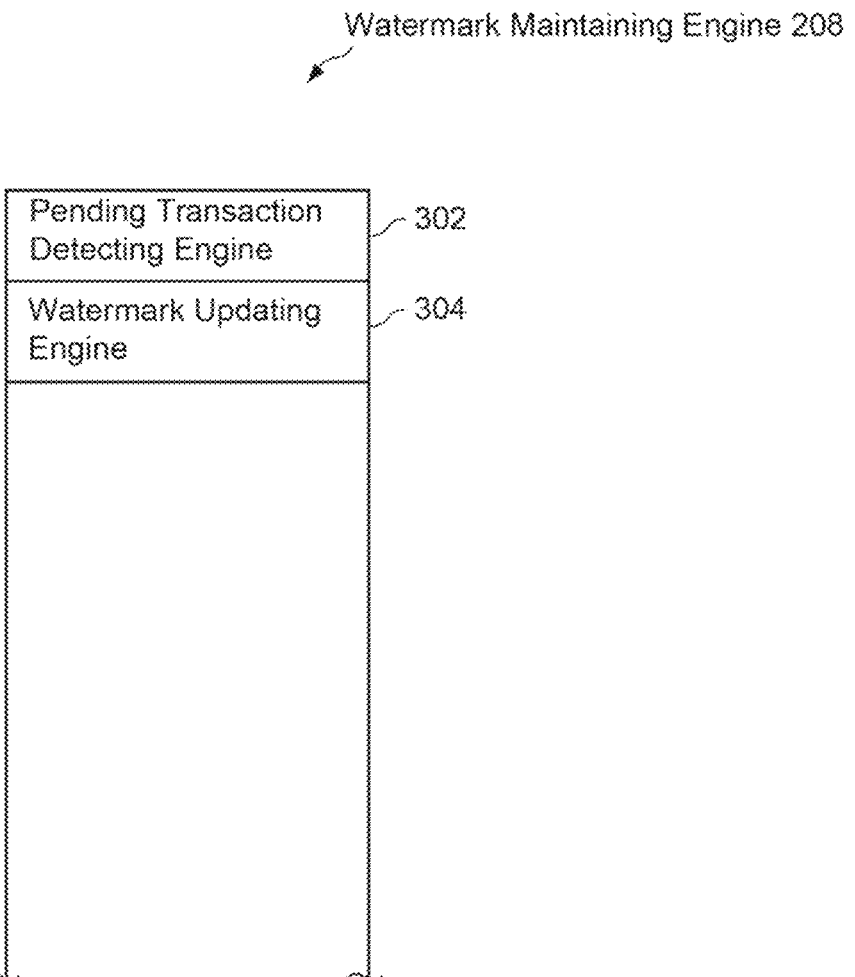
FIG. 3A is a block diagram illustrating details of a watermark maintaining engine, which performs selective updating of watermarks within the constituent data sources to indicate any changes in the constituent data sources, in accordance with some embodiments of the present invention.

FIG. 3A is a block diagram illustrating details of the watermark maintaining engine 208, in accordance with some embodiments of the present invention. The watermark maintaining engine 208 includes a pending transaction detecting engine 302 and a watermark updating engine 304. The watermark maintaining engine 208 ensures that any long-running transactions within constituent tables are also synchronized with the materialized views.

The pending transaction detecting engine 302 includes hardware, software and/or firmware capable of detecting a pending transaction, which is a separate ongoing transaction at a point in time when a change in an entry of a constituent table has been committed or confirmed (hereinafter "confirmed"). The pending transaction may be an unconfirmed change that is currently occurring, ongoing, or being processed in the same constituent table, or in a different constituent table, if the operations defined by the query involve both the constituent table and the different constituent table. The pending transaction began at an earlier time compared to the change that has been committed.

If the pending transaction detecting engine 302 detects such a pending transaction, then the pending transaction detecting engine 302 may determine to refrain from or delay updating of a watermark corresponding to the committed change. The pending transaction detecting engine 302 may accordingly transmit such an indication to the watermark updating engine 304. In this manner, during a subsequent synchronization, the long-running transaction may be synchronized with the materialized view. If the pending transaction detecting engine 302 fails to detect such a pending transaction, then the pending transaction detecting engine 302 may transmit an indication to the watermark updating engine 304 to update the watermark corresponding to the change that has been confirmed. The watermark updating engine 304 may selectively update the watermark. Updating of the watermark may include updating a timestamp, and/or monotonically increasing a previous value of the watermark, in order to record a most recent update.

Such a mechanism prevents pending transactions such as long-running transactions from being overlooked by the materialized view synchronizing engine 212. Otherwise, if the watermark updating engine 304 indiscriminately updated any watermarks of confirmed transactions without checking for pending transactions, then the already confirmed transaction would have a watermark with a higher value or a more recent time compared to the currently pending transaction. Thus, because the materialized view synchronizing engine 212 incrementally captures changes or transactions of higher value watermarks, the currently pending transaction may never be synchronized with the materialized views.

Figure 3B:
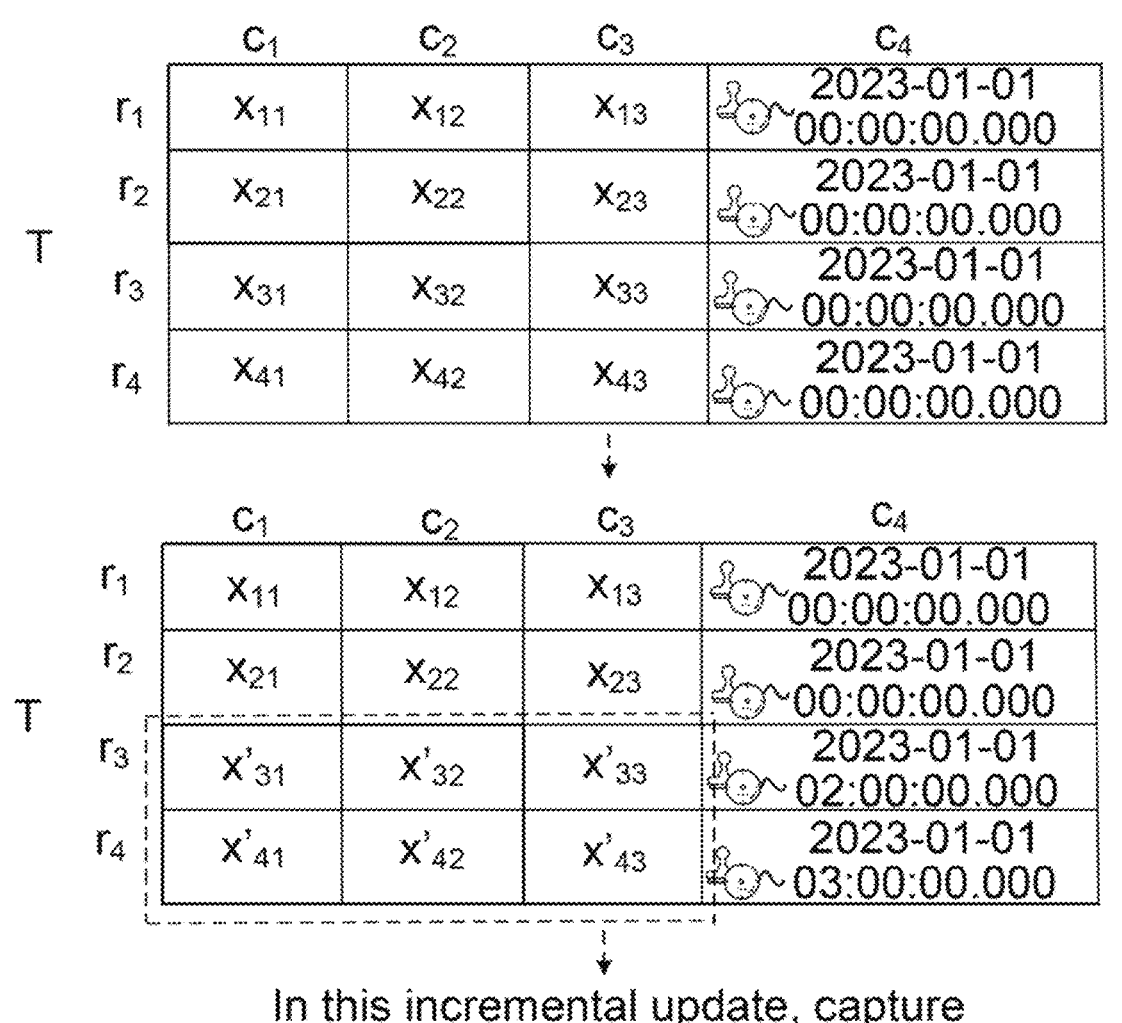
FIG. 3B is a diagram illustrating the concept of incremental maintenance, in accordance with some embodiments of the present invention.

FIG. 3B is a diagram illustrating the concept of incremental maintenance using watermark columns, which track updates of rows by updating watermark values. A table T may have been generated or obtained from the processing systems 109, in particular the materialized view generating engine 210. The table T has columns $c_1$, $c_2$, and $c_3$ of records, a watermark column $c_4$, and rows $r_1$, $r_2$, $r_3$, and $r_4$. The watermark column $c_4$ indicates a latest, or most recent, start time of a transaction that has been captured within a corresponding row. Initially, the records include $x_{11}$, $x_{12}$, and $x_{13}$ in the row $r_1$, $x_{21}$, $x_{22}$, and $x_{23}$ in the row $r_2$, $x_{31}$, $x_{32}$, and $x_{33}$ in the row $r_3$, and $x_{41}$, $x_{42}$, and $x_{43}$ in the row $r_4$. The watermark column $c_4$ initially indicates a timestamp corresponding to "2023-01-01 00:00:00.000." A query may be executed to obtain or retrieve any updated records at increments and store the updated records as part of a materialized view.

In a next, or subsequent, increment, records within the rows $r_3$ and $r_4$ may be updated to $x'_{31}$, $x'_{32}$, and $x'_{33}$ in the row $r_3$, and $x'_{41}$, $x'_{42}$, and $x'_{43}$ in the row $r_4$ as indicated by the updated watermark values in the watermark column $c_4$ compared to the latest previous watermark value of "2023-01-01 00:00:00.000." For example, the watermark corresponding to the row $r_3$ has updated to "2023-01-01 02:00:00.000," which indicates a most recent start time of a transaction within the row $r_3$. Meanwhile, the watermark corresponding to the row $r_4$ has updated to "2023-01-01 03:00:00.000," which indicates a most recent start time of a transaction within the row $r_4$. The watermarks corresponding to the rows $r_1$ and $r_2$ remain unchanged, indicating that the records in those rows are unchanged. Therefore, the processing systems 109, in particular the materialized view synchronizing engine 210, may capture only the updated records in the rows $r_3$ and $r_4$, while refraining from recapturing already captured records in the rows $r_1$ and $r_2$. In such a manner, the watermark maintaining engine 208 updates one or more particular watermarks in the watermark column $c_4$ to indicate which particular row or rows have updated records, and are to be retrieved.

In a next, or subsequent, increment, records within the rows $r_1$ and $r_2$ may be updated to $x'_{11}$, $x'_{12}$, and $x'_{13}$ in the row $r_1$, and $x'_{21}$, $x'_{22}$, and $x'_{23}$ in the row $r_2$ as indicated by the updated watermark values in the watermark column $c_4$ compared to a latest previous watermark value of "2023-01-01 03:00:00.000" in the previous increment. Specifically, the watermark corresponding to the row $r_1$ has updated to "2023-01-01 05:00:00.000," which indicates a most recent start time of a transaction within the row $r_1$. Meanwhile, the watermark corresponding to the row $r_2$ has updated to "2023-01-01 04:00:00.000," which indicates a most recent start time of a transaction within the row $r_2$. The watermarks corresponding to the rows $r_1$ and $r_2$ remain unchanged, indicating that the records in those rows are unchanged. Therefore, the processing systems 109, in particular the materialized view synchronizing engine 210, may capture only the updated records in the rows $r_1$ and $r_2$, while refraining from recapturing already captured records in the rows $r_3$ and $r_4$. In such a manner, the watermark maintaining engine 208 updates one or more particular watermarks in the watermark column $c_4$ to indicate which particular row or rows have updated records, and are to be retrieved.

An example of a query used to perform incremental updates, written using portions of pseudocode, may resemble the below:

```
SELECT MAX(C4) as INCREMENTAL_TIMESTAMP
FROM T;
--DELAY
SELECT *
WHERE *.C4 > INCREMENTAL_TIMESTAMP;
SELECT MAX(C4) as INCREMENTAL_TIMESTAMP
FROM T;
--IMPLEMENT CRON JOB TO PERFORM INCREMENTAL UPDATES
ON MATERIALIZED VIEWS
```

Figure 3C:
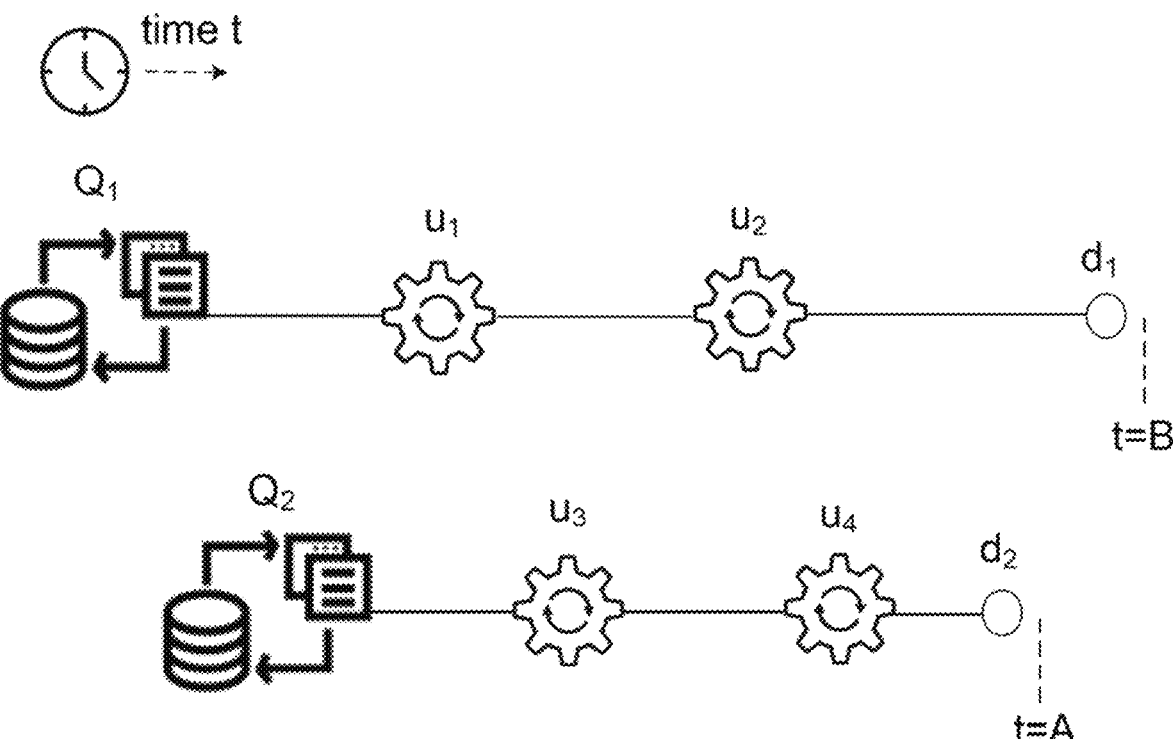
FIG. 3C is a diagram illustrating the concepts of capturing long-running transactions and duplicate elimination, in accordance with some embodiments of the present invention.

FIG. 3C illustrates a concept of long-running transactions. A transaction $Q_1$ has resulted in updates $u_1$ and $u_2$, and has been committed at $d_1$. Meanwhile, a transaction $Q_2$ may have commenced after the transaction $Q_1$ commenced. The transaction $Q_2$ may have resulted in updates $u_3$ and $u_4$, and may have been committed at $d_2$, which is before the transaction $Q_1$ committed. Relative times are illustrated along a horizontal axis. A query at a time t=A may have resulted in retrieving records corresponding to the updates $u_3$ and $u_4$, but failed to retrieve the records corresponding to the updates $u_1$ and $u_2$. At a time t=B, the updates $u_1$ and $u_2$ have committed. As a result of the query at time t=A, the watermark maintaining engine 208 may have updated a watermark value to that corresponding to $u_4$. Because of the updated watermark value, the updates $u_1$ and $u_2$ would still fail to be retrieved in subsequent increments because the watermarks corresponding to $u_1$ and $u_2$ are earlier than the watermark corresponding to $u_4$. Obtaining of records may be executed according to a SQL query such as "SELECT * from X where WATERMARK_VALUE>$u_4$. Here, X represents a table from which records are to be retrieved, and WATERMARK_VALUE represents a most recent watermark value from which records have been retrieved.

In order to capture the updates $u_1$ and $u_2$, another subsequent query may be executed, using an earlier start time, which may correspond to an earliest start time out of all previously non-recorded long-running transactions, which, here, corresponds to $u_1$. More specifically, the time at which the query may be executed is MIN(MAX(currently retrieving incremental results), MIN(long-running transactions)). Here, the maximum (e.g., latest) time of the "currently retrieving incremental results" is $u_4$ while the minimum (e.g., earliest) time of the long-running transactions is $u_1$. Since $u_1$ is earlier than $u_4$, evaluation of the aforementioned expression yields $u_1$.

However, running this subsequent query results in duplication of records corresponding to the updates $u_3$ and $u_4$, since those updates were already retrieved in the initial query and retrieved again in the subsequent query. The processing systems 109 may perform deduplication of the duplicated records. In some embodiments, deduplication of records may also occur in other scenarios besides long-running transactions. For example, such scenarios may include those in which only a portion of updates were captured, due to a fault or failure, and then a query is executed over again.

FIG. 4 is a block diagram illustrating details of the materialized view synchronizing engine 212. The materialized view synchronizing engine 212 includes a new entry detecting engine 402, a new entry synchronizing engine 404, a deletion detecting engine 406, a deletion synchronizing engine 408, a modification detecting engine 410, and a modification synchronizing engine 412. Overall, the materialized view synchronizing engine 212 may be configured to detect different types of changes to the constituent data, including additions (e.g., new entries), deletions, and/or modifications of existing entries. In some examples, the new entry detecting engine 402, the deletion detecting engine 406, and/or the modification detecting engine 410 may include or implement a listener, such as a Binary Log listener component, in order to obtain a list of constituent tables that are being updated. With the list of tables, a Binary Log Reader component refers to a metadata store and determines which materialized views correspond or refer to those constituent tables. The Binary Log Reader may inform the new entry synchronizing engine 404, the deletion synchronizing engine 408, or the modification synchronizing engine 412 to synchronize those views according to the updated constituent tables.

The new entry detecting engine 402 includes hardware, software and/or firmware capable of detecting a new entry, such as a new row, within any of the constituent data. In some examples, the new entry detecting engine 402 may detect a new row, as differentiated from a modified row, based on a history of watermarks, and more specifically, a comparison between a most recent watermark and any previous watermark. For example, if the new entry includes a new row, then the most recent watermark may be the only watermark for that new row, as no previous watermark existed. Therefore, the new entry detecting engine 402 may detect a new row based on an existence of only a single watermark, and no other historical watermarks, corresponding to that row.

The new entry synchronizing engine 404 includes hardware, software and/or firmware capable of synchronizing the new entry within the one or more materialized views, upon the new entry detecting engine 402 detecting the new entry. The new entry synchronizing engine 404 may add a row corresponding to the new entry, or cause such a row to be added, within the one or more materialized views. The new entry synchronizing engine 404 may populate the new entry within the added row. The adding of a row may include reserving an additional space within the one or more materialized views for the new entry. A location of the additional space may correspond to a location of the new entry within the constituent data. For example, if the location of the new entry within the constituent data corresponds to a last row, then an additional space may be reserved following a last row of the one or more materialized views. As another example, if the location of the new entry within the constituent data were between rows two and four, then the location of the additional space may also be reserved between rows two and four of the one or more materialized views.

The deletion detecting engine 406 includes hardware, software and/or firmware capable of detecting a deletion, such as a deletion of a row or an entry, within any of the constituent data. The deletion detecting engine 406 may detect the deletion based on an updated watermark corresponding to the deletion. In some examples, a deletion process commences with a soft delete, in which metadata indicates that the data is to be deleted without permanently erasing or purging the data. The scheduling of the deletion may occur after the deletion has been synchronized with the materialized view (e.g., the materialized view 512 of FIG. 5B). In some examples, the soft delete includes insertion of a tombstone to indicate a deleted entry. A soft delete ensures that an updated watermark corresponding to the deletion operation is still present and detectable by the deletion detecting engine 406. On the other hand, if an entry were permanently deleted without an initial soft deletion, then any watermarks associated with the entry may also be deleted. If no watermark is present, then the deletion detecting engine 406 may be unable to detect the deletion, and the deletion may fail to be synchronized with the materialized view 512.

The deletion synchronizing engine 408 includes hardware, software and/or firmware capable of synchronizing the deletion within the one or more materialized views. In some examples, the deletion synchronizing engine 408 deletes any entries within the one or more materialized views that correspond to the deletion within the constituent data, as detected by the deletion detecting engine 406. In some examples, the deletion synchronizing engine 408 performs a soft delete of the entries within the one or more materialized views.

The modification detecting engine 410 includes hardware, software and/or firmware capable of detecting a modification, such as a modification of an existing row or entry, within any of the constituent data. The modification detecting engine 410 may detect the deletion based on an updated watermark corresponding to the modification. The updated watermark may include any of an updated timestamp and a monotonic increase in a value compared to a previous iteration. In some examples, the modification detecting engine 410 may also detect a modification in a query, such as a modification in a primary key, a foreign key, and or any other statements.

The modification synchronizing engine 412 includes hardware, software and/or firmware capable of synchronizing the modification detected by the modification detecting engine 410. The modification synchronizing engine 412 may modify any entries that correspond to the detection of the modification, by the modification detecting engine 410, within the constituent data. In an event that the query is modified, the modification synchronizing engine 412 may determine any portion of the one or more materialized views affected by the modification in the query, and/or any portion of the one or more materialized views unaffected by the modification in the query. The modification synchronizing engine 412 may, instead of rerunning the modified query from the beginning, limit the synchronizing to the portion of the one or more materialized views affected by the modification in the query.

Figure 5A:
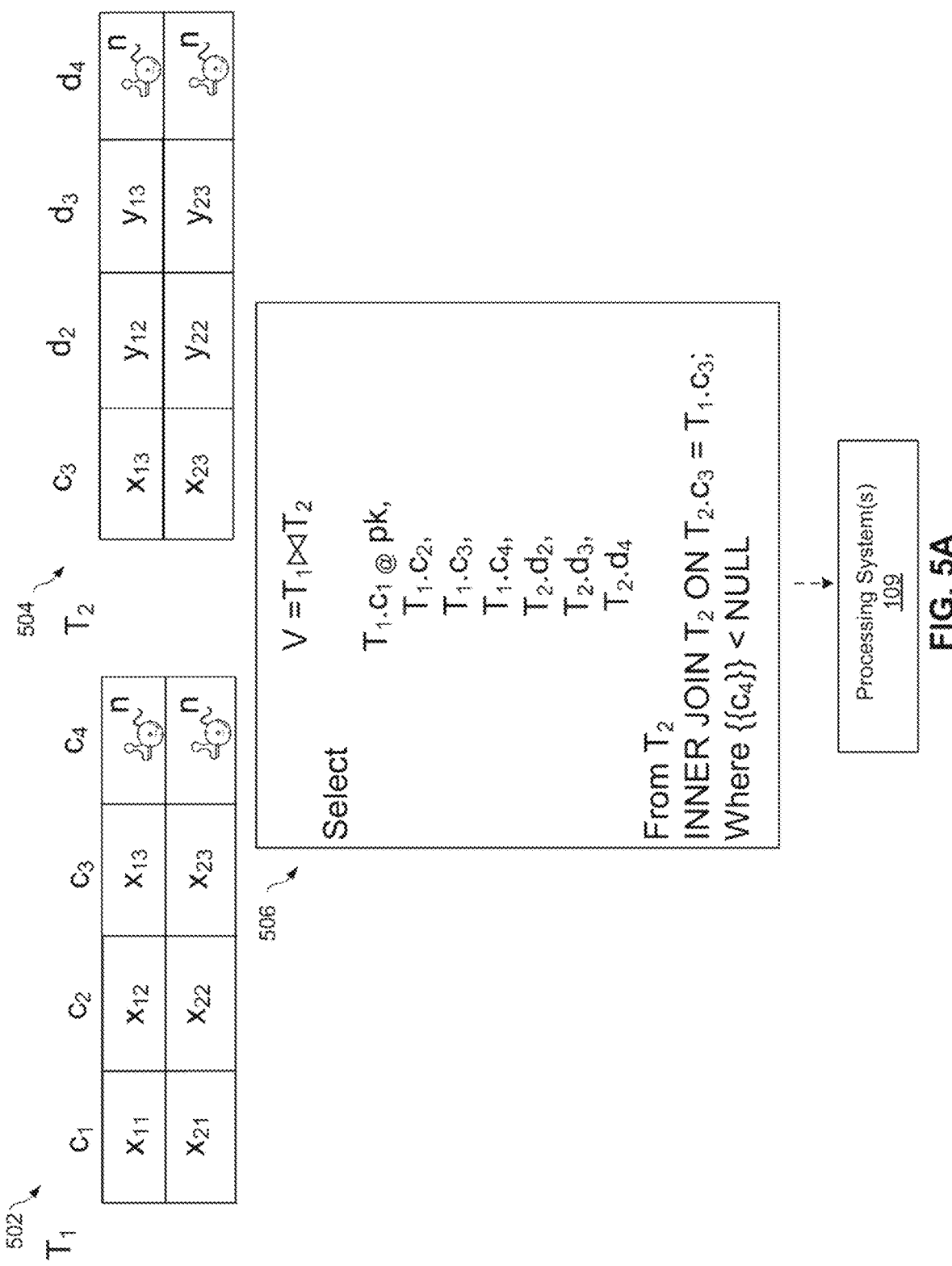

FIGS. 5A, 5B, 6-8, 9A, and 9B are diagrams that further elucidate concepts previously described in FIGS. 2, 3A, 3B, 3C, and 4. In FIG. 5A, the processing systems 109, in particular, the query obtaining engine 202, may obtain a query 506. The query 506 may define a join operation, including any tables and columns to be joined, a primary key, and a foreign key, and any other conditions, such as watermark conditions. The query 506 may include the tables and columns within the tables to be joined within the "Select" function as $T_1.c_1$, $T_1.c_2$, $T_1.c_3$, $T_1.c_4$, $T_2.d_2$, $T_2.d_3$, and $T_2.d_4$. The query 506 may indicate a column $c_1$ of a constituent table $T_1$ as corresponding to a primary key. The query 506 may further indicate a column $c_3$ within a constituent table $T_2$ as a foreign key, because the column $c_3$ within the constituent table $T_2$ matches a column $c_3$ within the constituent table $T_1$. Upon the query obtaining engine 202 obtaining the query 506, the parsing engine 204 may parse the query 506. Once the query 506 is parsed, the constituent data obtaining engine 206 may obtain the constituent tables and constituent columns on which the join operation is to be performed, here, constituent tables 502 and 504, which correspond to tables $T_1$ and $T_2$. The constituent tables 502 and 504 may also include watermarks, for example, within watermark columns $c_4$ and $d_4$, respectively.

Figure 5B:
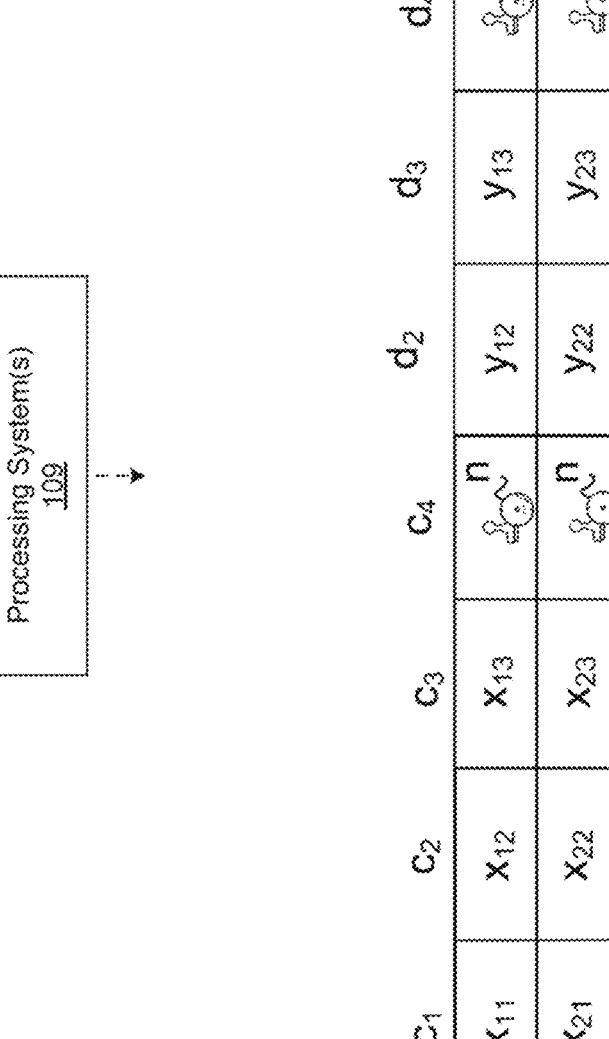

In FIG. 5B, the processing systems 109, in particular, the materialized view generating engine 210, may generate a materialized view resulting from execution of a join operation as defined by the query 506. In particular, the materialized view generating engine 210 may generate a materialized view 512, and includes columns $c_1$, $c_2$, $c_3$ and $c_4$ from the constituent table 502 and the columns $d_2$, $d_3$ and $d_4$ from the constituent table 504. The materialized view 512 may include entries $x_{11}$, $x_{12}$, $x_{13}$, $y_{12}$, $y_{13}$, $x_{21}$, $x_{22}$, $x_{23}$, $y_{22}$, and $y_{23}$. In some other examples, the watermark maintaining engine 208 may add watermarks to the entries or the rows of the materialized view 512, if watermarks do not already exist.

FIG. 6 illustrates a scenario of synchronizing a materialized view according to new or added entries compared to the constituent tables 502 and 504 of FIGS. 5A and 5B. In FIG. 6, the processing systems 109, in particular, the new entry detecting engine 402 of the materialized view synchronizing engine 212, may detect new entries in row 612 of an updated constituent table 602 and new entries in row 614 of an updated constituent table 604. The new entries in the row 612 may include entries $x_{31}$, $x_{32}$, and $x_{33}$. The new entries in the row 614 may include entries $x_{33}$, $y_{32}$, and $y_{33}$. The new entry detecting engine 402 may determine that the rows 612 and 614 contain new entries, as opposed to modifications of existing entries, at least because the only historical watermarks for the rows 612 and 614 have a value of "n+1." These watermarks represent an updated watermark compared to the previous watermark having a value of "n." The most recent synchronization synchronized entries having watermarks with a value of "n" or lower, so by detecting a value of "n+1," the new entry detecting engine 402 may determine that synchronization is needed. Because no previous watermarks besides "n+1" for the rows 612 and 614 existed, the new entry detecting engine 402 may determine that the rows 612 and 614 did not exist prior to a time corresponding to "n+1." Upon detecting the rows 612 and 614 and determining that they constitute new entries, the new entry detecting engine 402 may output an indication of the new entries, and/or a relative location of the new entries within the constituent tables 502 and 504 to the new entry synchronizing engine 404. The new entry synchronizing engine 404 may synchronize the new entries in the updated constituent tables 602 and 604 by adding new entries $x_{31}$, $x_{32}$, $x_{33}$, $y_{32}$, and $y_{33}$ to a new row 632 of an updated materialized view 622. Because the rows 612 and 614 were appended to last rows of the constituent tables 502 and 504, the new entry synchronizing engine 404 may append the new row 632 to a last row of the materialized view 512.

Figure 7:
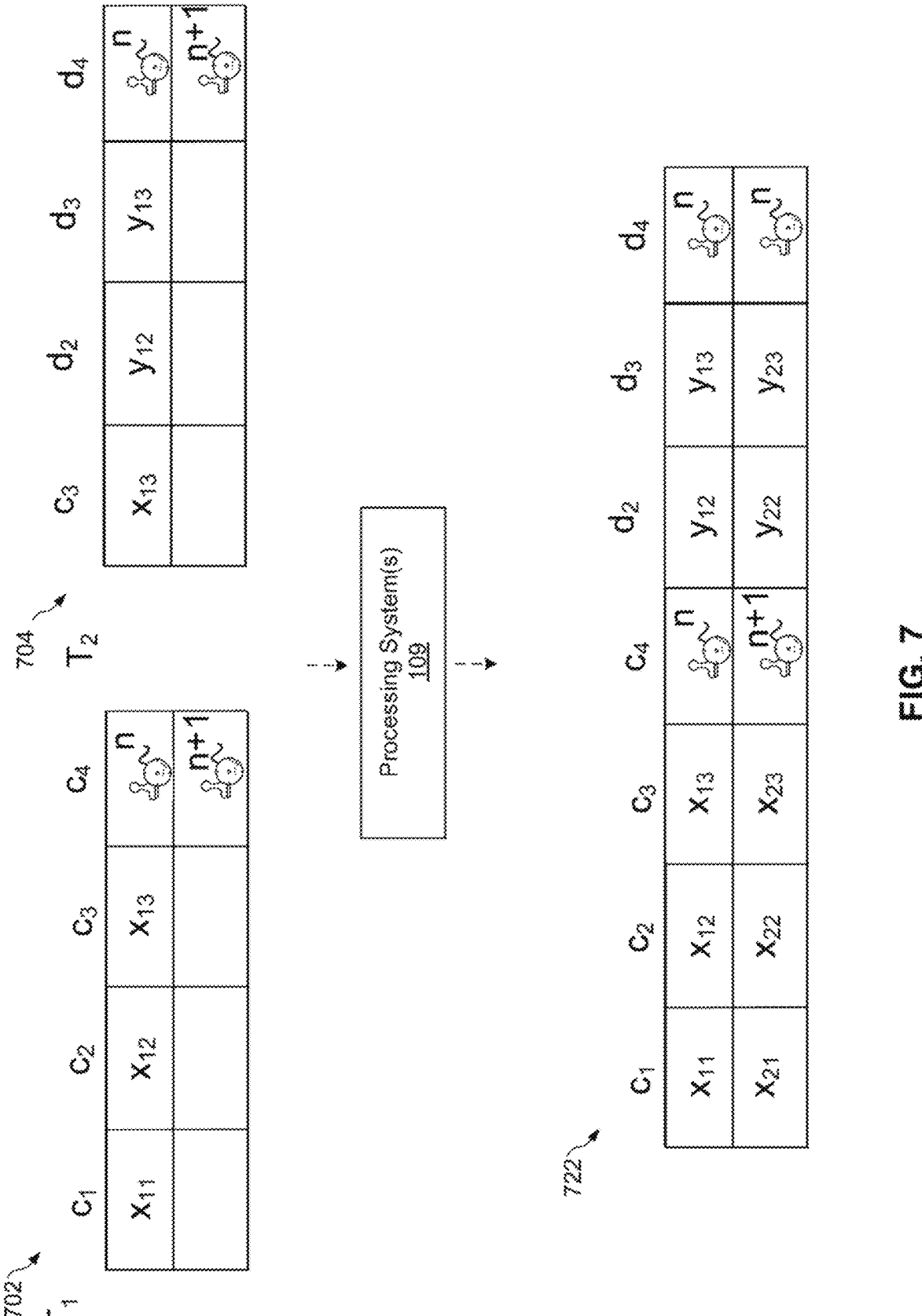

FIG. 7 illustrates a scenario of synchronizing a materialized view according to entries scheduled for deletion from the constituent tables 502 and 504 of FIGS. 5A and 5B. In FIG. 7, the processing systems 109, in particular, the deletion detecting engine 406 of the materialized view synchronizing engine 212, may detect deleted entries within row 712 of modified constituent table 702, and deleted entries within row 714 of modified constituent table 704. Here, in FIG. 7, the deleted entries may correspond to the second rows of the constituent tables 502 and 504. The deleted entries have been soft deleted rather than hard deleted. The deletion detecting engine 406 may detect updated watermarks "n+1" corresponding to the soft deleted entries, and that the soft deleted entries have metadata indicating that the entries are to be deleted, or are scheduled for deletion. Upon detecting entries scheduled for deletion, the deletion detecting engine 406 may transmit an indication of the deleted entries to the deletion synchronizing engine 408. The deletion synchronizing engine 408 may delete corresponding entries of the materialized view 512, here, corresponding to a last row of the materialized view. The deletion synchronizing engine 408 may perform a soft delete on a row 732 of a modified materialized view 722. After a period of time, the deletion synchronizing engine 408 may perform a permanent deletion of the row 732.

Figure 8:
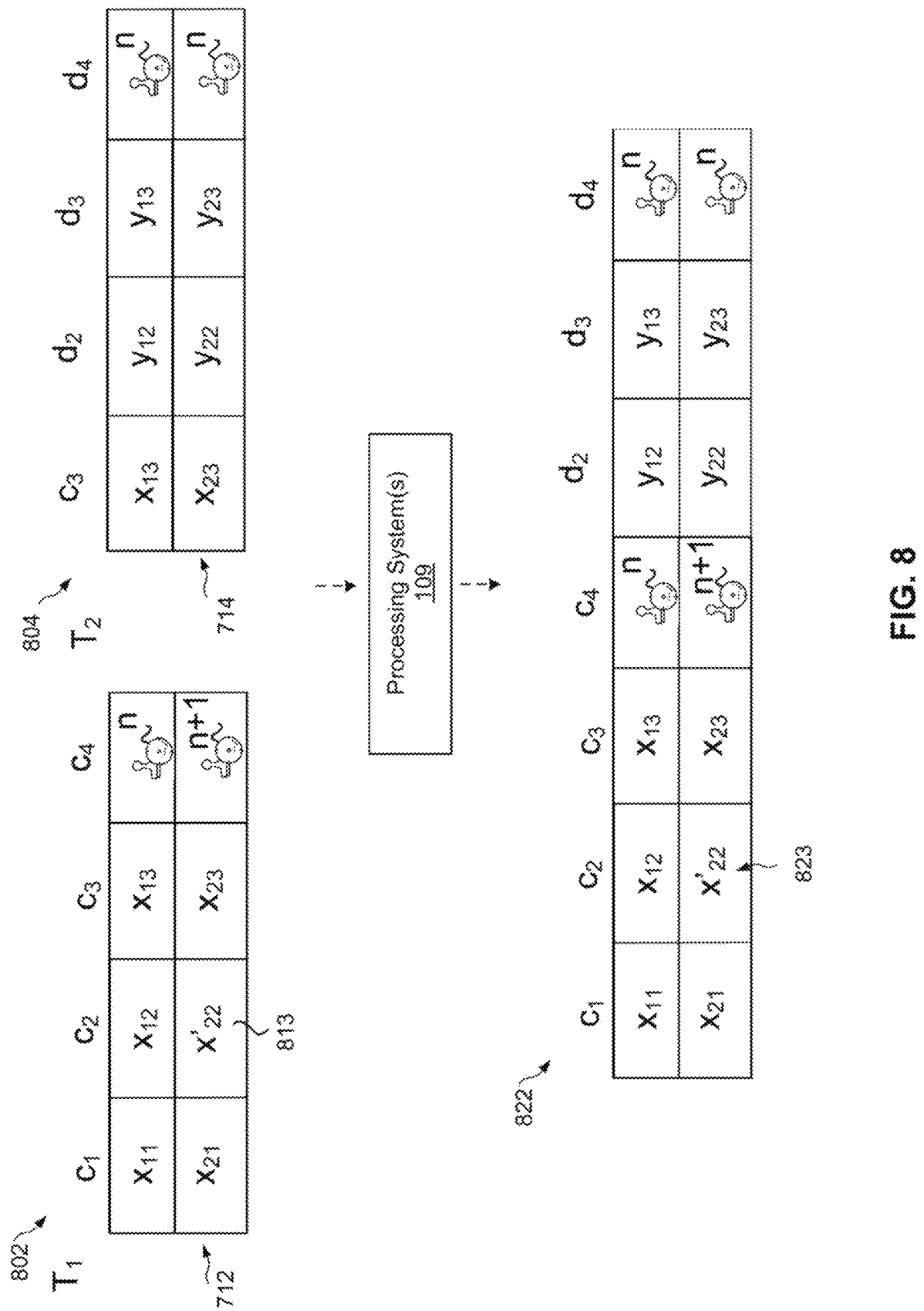

FIG. 8 illustrates a scenario of synchronizing a materialized view according to modifications of entries compared to the constituent tables 502 and 504 of FIGS. 5A and 5B. In FIG. 8, the processing systems 109, in particular, the modification detecting engine 410 of the materialized view synchronizing engine 212, may detect a modified entry 813 within the row 712 of modified constituent table 802 based on an update in a watermark of the row 712 to "n+1." Here, in FIG. 8, the modified entry may correspond to the second row of the constituent table 502. The modified entry 813 may have resulted in a change of a value from $x_{22}$ to $x'_{22}$. The modification detecting engine 410 may detect a location in the materialized view 512 that corresponds to a relative location of the modified entry 813 within the modified constituent table 802. Here, the modification detecting engine 410 may detect that that the modified entry 813 corresponds to a second row and a second column of the materialized view 512, or a location 823 of a modified materialized view 822.

Upon detecting modified entries, the modification detecting engine 410 may transmit an indication of the modified entries to the modification synchronizing engine 412. The modification synchronizing engine 412 may modify corresponding entries of the materialized view 512, here, corresponding to a second row and a second column of the materialized view 512, or a location 823 of a modified materialized view 822. The modification synchronizing engine 412 may change a value of an entry at the location 823 from $x_{22}$ to $x'_{22}$.

Figure 9A:
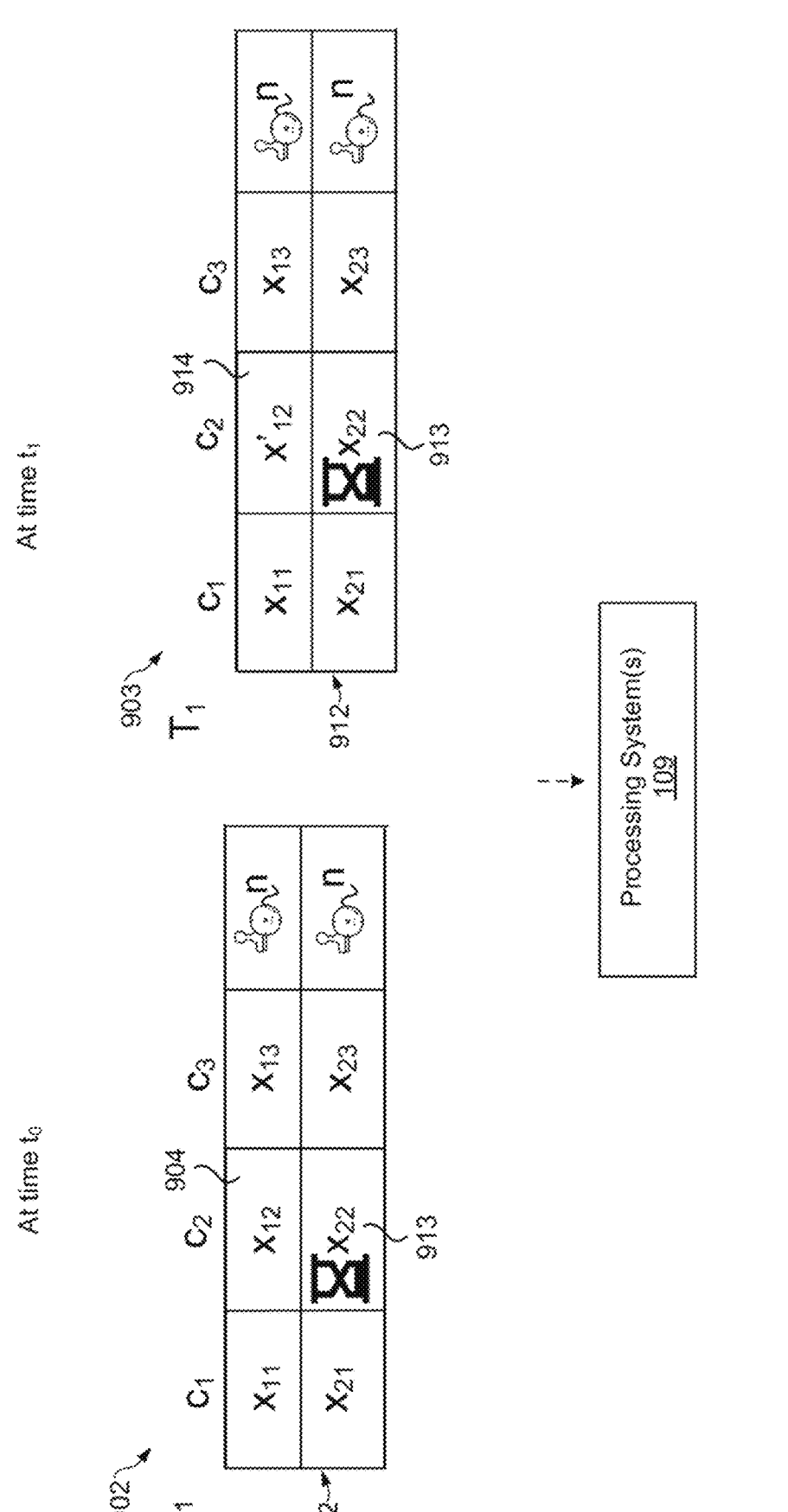
Figure 9B:
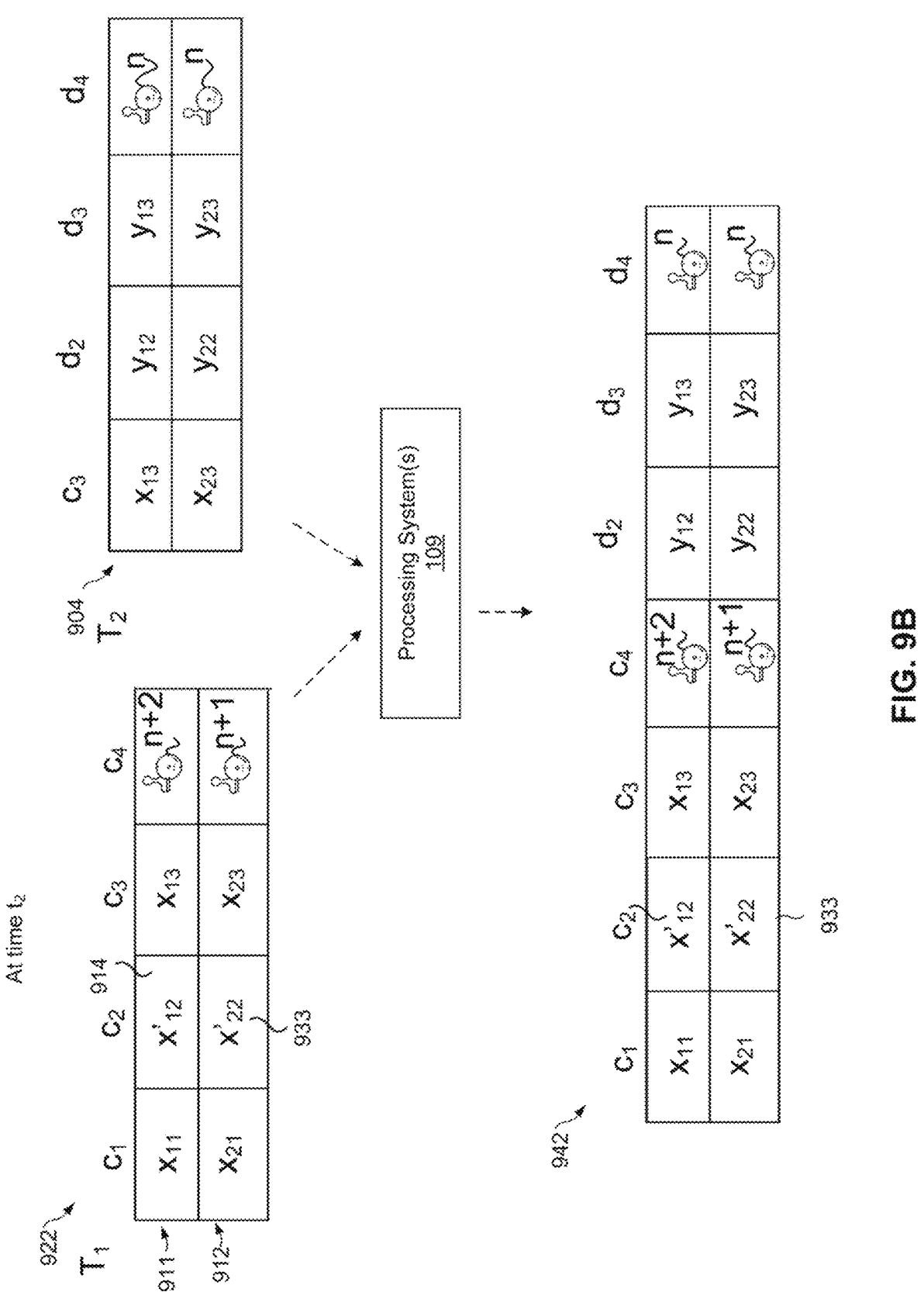

FIGS. 9A and 9B illustrate a scenario of a long-running transaction, in which a first transaction in a first entry of a constituent table commences prior to a second transaction in a second entry of the constituent table, but the first transaction is confirmed after the second transaction is confirmed. Although in this description, the first transaction and the second transaction are assumed to occur in different rows of the constituent table, the principles below also apply if the first transaction and the second transaction occur in a same row, or even in a same entry or location of the constituent table. In FIG. 9A, a first transaction may be ongoing in an entry 913 of a constituent table 902, at time $t_0$. The first transaction may have commenced prior to a start of a second transaction that is going to occur in an entry 904. At time $t_o$, no second transaction has started yet. At time $t_1$, the second transaction may already have been confirmed, in a modified entry 914 of a modified constituent table 903. The second transaction resulted in a change of value of the modified entry 914 from $x_{23}$ to $x'_{23}$. Upon the second transaction being confirmed, the pending transaction detecting engine 302 of the watermark maintaining engine 208 may determine that the first transaction in the entry 913 is still pending, and had started prior to a start of the second transaction. Upon detecting this pending transaction, the pending transaction detecting engine 302 may output an indication to the watermark updating engine 304 regarding a presence of a pending transaction that would have an earlier watermark relative to the second transaction, and/or to refrain from updating a watermark corresponding to the entry 914 until the pending transaction has been confirmed.

In FIG. 9B, at time $t_2$, assume that the first transaction has been confirmed, and the entry 913 has been updated as a modified entry 933 within the row 912 in a modified constituent table 922. The modified entry 933 may cause a watermark of the row 912 to be updated to "n+1" and the modified entry 914 may cause a watermark of row 911 to be updated to "n+2." The modified entries 933 and 914 may be synchronized with a materialized view, as shown in a modified materialized view 942. Therefore, the modified materialized view 942 may incorporate both the modified entries 933 and 914.

On the other hand, if at time $t_1$, the modified entry 914 had already caused the watermark corresponding to the row 911 to be updated to "n+2," then the modified entry 914 would have been synchronized with a materialized view. At time $t_2$, the modified entry 933 would have caused the watermark corresponding to the row 912 to be updated to "n+1" which means that the modified entry 933 would not be synchronized with a materialized view.

In other examples, capturing of long running-transactions such as the first transaction may be performed by executing a subsequent query. Here, the subsequent query may be executed to obtain any records in which a starting time of the query corresponds to a time at which the first transaction has commenced (e.g., $t_0$), rather than running a query based on a time of the second transaction (e.g., $t_1$). Any duplicate records obtained by the subsequent query, such as those corresponding to the second transaction (e.g., the modified entry 914) may be deduplicated.

FIGS. 10A and 10B are diagrams that illustrate a join operation involving more than two tables. In FIG. 10A, constituent tables 1002, 1004, 1006, and 1008 are to be joined according to a join operation as defined by the query 1010. The processing systems 109, I particular, the query obtaining engine 202, may obtain the query 1010. The parsing engine 204 may parse the query 1010 to determine which constituent tables to obtain, for example, from the datastores 114. Upon parsing the query 1010, the parsing engine 204 may determine that the constituent tables 1002, 1004, 1006, and 1008 were referenced by the query 1010. The constituent data obtaining engine 206 may then obtain the constituent tables 1002, 1004, 1006, and 1008.

In FIG. 10B, the materialized view generating engine 210 may generate a materialized view 1012 by joining the constituent tables 1002, 1004, 1006, and 1008. The materialized view generating engine 210 may further append a hash 1013 into a column of the materialized view 1012. The hash 1013 may represent a combination of multiple keys, such as a primary key and a foreign key, and/or multiple primary keys, to uniquely identify a row of entries in the materialized view 1012. In some examples, a presence of the hash 1013 may indicate that the corresponding entries (e.g., rows) in the materialized view 1012 are modifications of existing entries rather than new entries. Otherwise, an absence of the hash 1013 may indicate that the corresponding rows may include new entries. In other words, a hash may be generated only when the entries of a row were previously existing.

FIG. 11 illustrates a diagram that further illustrates an exemplary architecture of a multi-tenant system illustrated in FIG. 1. In FIG. 11, the tenant data 120 may be obtained by the multi-tenant system 102 from a source database 1102. In some examples, the source database 1102 may include different types of data, such as billing data, geospatial data, sensor data, and/or other stored data. The multi-tenant system 102 may include one or more event listeners 1104 to detect any changes within the source database 1102. A task scheduler 1106 may schedule tasks such as any functions described in previous FIGS. 2, 3A, 3B, 3C, 4, 5A-5B, 6-8, 9A-9B, and 10A-10B. Specifically, the tasks may include generating materialized views and synchronizing any changes in the source database 1102 with corresponding materialized views. The task scheduler 1106 may store, or cause to be stored, any materialized views that have been generated and synchronized, in a ground truth platform 1107. Additionally, the tasks may include generating and rendering certain reports, such as transactional reports which include real-time data, analytics reports and dashboards, which involve aggregation and summarization, and custom reports. Possible modes to render the reports include a direct query mode, which involves a call out to a data source to retrieve the relevant data, and an import mode, in which data is ingested into an in-memory database via extract, transform, load (ETL) chains and would support dynamic roll-ups and drill-downs, without cross-cloud latencies. These reports may be stored downstream in the ground truth platform 1107, the target database 1112, and/or other downstream storage.

The ground truth platform 1107 may include an intermediary storage cache where denormalized views may be stored for querying. The ground truth platform 1107 may update a target database 1112, which may be accessed by tenants 1110. The ground truth platform 1107 may compare an iteration or a version (hereinafter "iteration") of a materialized view stored in the target database 1112 to an iteration stored in a storage space within the ground truth platform 1107. Upon detecting a discrepancy in the two aforementioned iterations, the ground truth platform 1107 may transmit a most updated iteration to the target database 1112.

The target database 1112 may include one or more storage spaces and one or more event listeners for each tenant. The one or more event listeners may detect, or receive an indication of, any changes within the source database 1102. Upon detecting of changes, a particular tenant may request a most recent iteration of a materialized view stored in the ground truth platform 1107.

In some implementations, downstream of the target database 1112 may be a columnar storage, which is equipped for fast querying. In the columnar storage, telemetry data may be stored separately from revenue and billing data. In the columnar storage, data of tenants may be combined with any materialized views within the columnar storage.

In some examples, the multi-tenant system 102 may include a group of topic divided clusters 1108 and event divided clusters 1114. The topic divided clusters 1108 and the event divided clusters 1114 may include collaborative servers that facilitate speed, durability, and scalability. The topic divided clusters 1108 may process different data differentiated on a basis of topics. For example, the topic divided clusters 1108 may process different categories of topics such as scheduled topics, on-demand topics, manual or resynchronization topics, and/or future topics. Meanwhile, the event divided clusters 1114 may process different categories of events such as data platform (e.g., Cauldron) events, resynchronization events, and future topics.

FIG. 12 is a flowchart of a method 1200 of generating a representation of data that results from an operation across multiple constituent data sources and synchronizing the representation with any changes in the constituent data sources. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

Method 1200 begins with the source database (e.g., as part of the datastores 114 and/or the source database 1102) storing constituent records (e.g., the constituent tables 502, 504 in FIG. 5A) in step 1202. At least some of the constituent records may be manifested in a tabular format, and/or may include normalized (e.g., supernormalized) data.

In step 1204, one or more hardware processors (e.g., the query obtaining engine 202 in FIG. 2) may obtain a query (e.g., the query 506). The query may have originated from any of customer devices 106, the tenant interfaces 110, or other sources, or may have been automatically generated. The query may include statements defining one or more operations to be performed on a subset of the constituent records referred to within the statements. The query may specify a particular type of operation such as a join operation, a subset of the constituent records on which the one or more operations are to be performed, one or more primary keys and/or foreign keys within the join operation, and one or more other conditions, such as conditions regarding watermarks.

In step 1206, the one or more hardware processors (e.g., the parsing engine 204 in FIG. 2) may parse the query to decipher a type of the one or more operations, and the subset of the constituent records referred to within the statements. In step 1208, the one or more hardware processors (e.g., the constituent data obtaining engine 206) may obtain, from the source database, the subset of the constituent records referred to in the parsed query. In step 1210, the one or more hardware processors (e.g., the materialized view generating engine 210) may executing the one or more operations. The execution of the one or more operations may generate a materialized view that denormalizes the subset of the constituent records. In step 1212, the one or more hardware processors (e.g., the materialized view synchronizing engine 212) may detecting any changes occurring in the subset of the constituent records, or that have occurred since the generating of the materialized view, or a most recent synchronization of the materialized view. These changes may be detected by an event listener, such as a binary listener. Exemplary changes include added or new data, scheduled deletions of data, and modifications of existing entries, and are illustrated in FIGS. 6-8, 9A and 9B. In step 1214, the one or more hardware processors (e.g., the materialized view synchronizing engine 212) may synchronize the materialized view with the any detected changes. For example, if a constituent record that was part of the materialized view has changed, then the materialized view may also be changed consistent with the constituent record. In step 1216, the one or more hardware processors (e.g., the materialized view synchronizing engine 212) may store the synchronized materialized view within a data platform (e.g., the ground truth platform 1107) of the multi-tenant system. In step 1218, the one or more hardware processors (e.g., within the data platform) may transmit the synchronized materialized view to a target database (e.g., the target database 1112 of FIG. 11) that is accessible by tenants. In some examples, the one or more hardware processors may detect when the target database is connected and/or online, and selectively transmit a most updated synchronized materialized view, if the target database is not currently storing the most updated synchronized materialized view.

Figure 13:
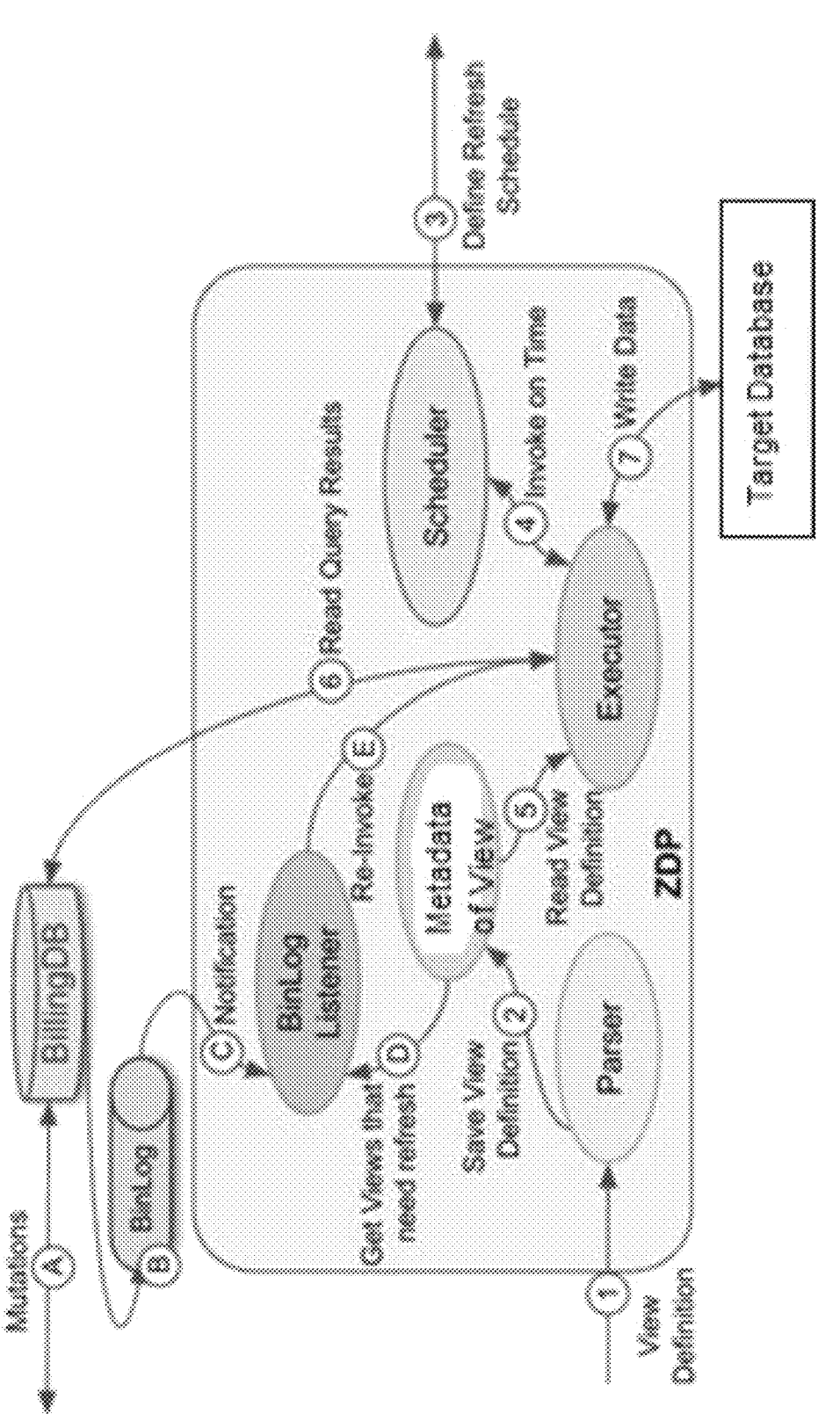
FIG. 13 is a diagram that further illustrates an exemplary process of generating a materialized view and synchronizing the materialized view with changes in constituent data, according to some embodiments of the present invention.

FIG. 13 is a diagram that further illustrates an exemplary process of generating a materialized view and synchronizing the materialized view with changes in constituent data. Referring to FIG. 13, a parser, such as a MySQL parser, may parse a definition of a view and store the definition as metadata. The view can be defined to be materialized, in which event results of running the query corresponding to the view will be stored in a database, such as a database in the ground truth platform 1107 and/or a target database (e.g., the target database 1112). After the view is defined, a scheduler may transmit, to an executor, an indication of when to obtain source data (e.g., the constituent data) from a source database (e.g., the source database 1102). Once the source data is obtained, the query may be executed to generate the materialized views. The materialized views may be synchronized with any changes in the constituent data, as described previously with respect to FIGS. 2, 3A, 3B, 3C, 4, 5A, 5B, 6-8, 9A, 9B, 10A, 10B, and 11-12.

Figure 14:
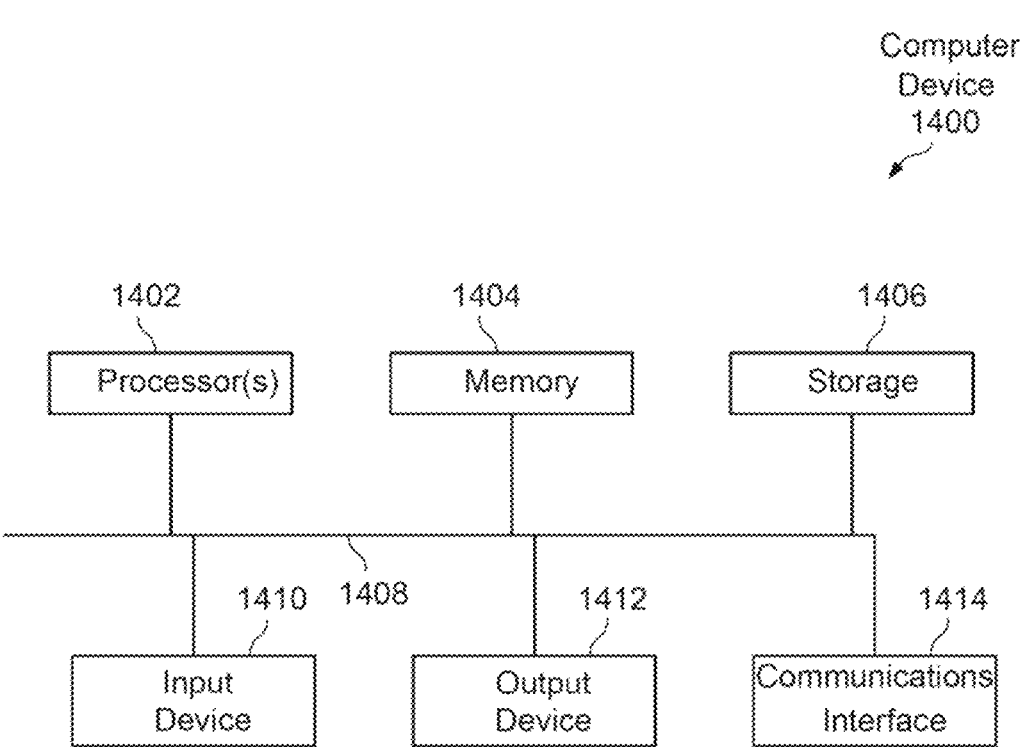
FIG. 14 is a block diagram illustrating details of a computing system.

FIG. 14 is a block diagram of a computing device 1400. Any of the systems, engines, datastores, and/or networks described herein may comprise an instance of one or more computing devices 1400. In some embodiments, functionality of the computing device 1400 is improved to perform some or all of the functionality described herein. The computing device 1400 comprises a processor 1402, memory 1404, storage 1406, an input device 1410, a communication network interface 1414, and an output device 1412 communicatively coupled to a communication channel 1408. The processor 1402 is configured to execute executable instructions (e.g., programs). In some embodiments, the processor 1402 comprises circuitry or any processor capable of processing the executable instructions.

The memory 1404 stores data. Some examples of memory 1404 include storage devices, such as RAM, ROM, RAM cache, virtual memory, etc. In various embodiments, working data is stored within the memory 1404. The data within the memory 1404 may be cleared or ultimately transferred to the storage 1406.

The storage 1406 includes any storage configured to retrieve and store data. Some examples of the storage 1406 include flash drives, hard drives, optical drives, cloud storage, and/or magnetic tape. In some embodiments, storage 1406 may include RAM. Each of the memory 1404 and the storage 1406 comprises a computer-readable medium, which stores instructions or programs executable by processor 1402.

The input device 1410 may be any device that inputs data (e.g., mouse and keyboard). The output device 1412 may be any device that outputs data and/or processed data (e.g., a speaker or display). It will be appreciated that the storage 1406, input device 1410, and output device 1412 may be optional. For example, the routers/switchers may comprise the processor 1402 and memory 1404 as well as a device to receive and output data (e.g., the communication network interface 1414 and/or the output device 1412).

The communication network interface 1414 may be coupled to a network (e.g., the network system 100) via the link 1408. The communication network interface 1414 may support communication over an Ethernet connection, a serial connection, a parallel connection, and/or an ATA connection. The communication network interface 1414 may also support wireless communication (e.g., 802.11 a/b/g/n, WiMax, LTE, WiFi). It will be apparent that the communication network interface 1414 may support many wired and wireless standards.

It will be appreciated that the hardware elements of the computing device 1400 are not limited to those depicted. A computing device 1400 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1402 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance. It will be appreciated that the term "request" shall include any computer request or instruction, whether permissive or mandatory.

The databases/datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A multi-tenant system, comprising:
one or more hardware processors; and
memory storing computer instructions, the computer instructions when executed by the one or more hardware processors cause the one or more hardware processors to perform operations comprising:
receiving a request to perform an incremental update of a materialized view generated from
detecting, based on watermarks of the constituent records, one or more changes that were committed in the constituent records relative to a time that the materialized view was last updated;
synchronizing the materialized view with the one or more detected changes including executing a first query to obtain initial incremental updates based on the watermarks of the constituent records;
determining that an uncaptured long-running transaction was initiated before the latest incremental update of the initial incremental updates;
in response to determining that an uncaptured long-running transaction was initiated before the latest incremental update of the initial incremental updates, executing a subsequent query to capture additional incremental updates committed by the long-running transaction after the request to perform the incremental update was received;
updating the materialized view within a data platform of the multi-tenant system using the initial incremental updates and the additional incremental updates; and
transmitting the synchronized materialized view to a target database accessible by tenants.

2. The multi-tenant system of claim 1, wherein at least a portion of the constituent records of the subset of constituent records is stored in a tabular format, and the one or more operations comprise a join operation.

3. The multi-tenant system of claim 1, wherein the detecting of one or more changes comprises detecting an addition, a deletion, or a modification to existing data in the subset of the constituent records.

4. The multi-tenant system of claim 3, wherein the detecting of one or more changes comprises detecting a deletion; and the detecting of the deletion comprises detecting an indication that a row or a portion of a row is scheduled to be deleted.

5. The multi-tenant system of claim 1, wherein:

the detecting of one or more changes comprises detecting an update to a watermark corresponding to one or more rows of the subset of the constituent records; and the update to the watermark comprises a monotonic increase in a value of the watermark beyond a highest value of a previous watermark in a most recent generation or synchronization of the materialized view.

6. The multi-tenant system of claim 1, wherein:

the detecting of one or more changes comprises detecting an update to a watermark corresponding to one or more rows of the subset of the constituent records;

the watermark comprises a timestamp; and the update to the watermark comprises an update to the timestamp, the updated timestamp indicating a time later than a latest time of a previous watermark in a most recent generation or synchronization of the materialized view.

7. The multi-tenant system of claim 1, wherein the detecting one or more changes occurring in the subset of the constituent records comprises detecting a first change in a first record, the first record being changed by a first transaction having a first starting time and being confirmed at a first ending time; and wherein the computer instructions are further configured to perform:

detecting an unconfirmed second change in a second record, the second record being changed by a second transaction having a second starting time, the second starting time being before the first starting time;

in response to detecting the unconfirmed second change, refraining from updating a watermark corresponding to the first record; and refraining from synchronizing the first change with the materialized view until the unconfirmed second change has been confirmed.

8. The multi-tenant system of claim 1, wherein updating the materialized view using the initial incremental updates and the additional incremental updates comprises removing duplicates from the additional incremental updates that also occur in the initial incremental updates.

9. The multi-tenant system of claim 1, wherein the parsing of the query comprises deciphering a primary key of a first table and a foreign key of a second table to be joined.

10. The multi-tenant system of claim 1, wherein the data platform:

compares a most updated iteration of the materialized view within the target database with a most updated iteration of the materialized view within the data platform;

determines whether the most updated iteration of the materialized view within the target database matches the most updated iteration of the materialized view within the data platform;

in response to determining that the most updated iteration of the materialized view fails to match the most updated iteration of the materialized view within the data platform, transmits the most updated iteration of the materialized view within the data platform to the target database.

11. The multi-tenant system of claim 1, wherein the data platform comprises a row-major relational database to store the synchronized materialized view.

12. A method implemented by a multi-tenant system, the method comprising:

receiving a request to perform an incremental update of a materialized view generated from constituent records stored within a source database;

detecting, based on watermarks of the constituent records, one or more changes that were committed in the constituent records relative to a time that the materialized view was last updated;

synchronizing the materialized view with the one or more detected changes including executing a first query to obtain initial incremental updates based on the watermarks of the constituent records;

determining that an uncaptured long-running transaction was initiated before the latest incremental update of the initial incremental updates;

in response to determining that an uncaptured long-running transaction was initiated before the latest incremental update of the initial incremental updates, executing a subsequent query to capture additional incremental updates committed by the long-running transaction after the request to perform the incremental update was received;

updating the materialized view within a data platform of the multi-tenant system using the initial incremental updates and the additional incremental updates; and transmitting the synchronized materialized view to a target database accessible by tenants.

13. The method of claim 12, wherein at least a portion of the constituent records of the subset of constituent records is stored in a tabular format, and the one or more operations comprise a join operation.

14. The method of claim 12, wherein the detecting of one or more changes comprises detecting an addition, a deletion, or a modification to existing data in the subset of the constituent records.

15. The method of claim 12, wherein the detecting of one or more changes comprises detecting a deletion; and the detecting of the deletion comprises detecting an indication that a row or a portion of a row is scheduled to be deleted.

16. The method of claim 12, wherein:

the detecting of one or more changes comprises detecting an update to a watermark corresponding to one or more rows of the subset of the constituent records; and the update to the watermark comprises a monotonic increase in a value of the watermark beyond a highest value of a previous watermark in a most recent generation or synchronization of the materialized view.

17. The method of claim 12, wherein:

the detecting of one or more changes comprises detecting an update to a watermark corresponding to one or more rows of the subset of the constituent records;

the watermark comprises a timestamp; and the update to the watermark comprises an update to the timestamp, the updated timestamp indicating a time later than a latest time of a previous watermark in a most recent generation or synchronization of the materialized view.

18. The method of claim 12, wherein the detecting one or more changes occurring in the subset of the constituent records comprises detecting a first change in a first record, the first record being changed by a first transaction having a first starting time and being confirmed at a first ending time; and wherein the computer instructions are further configured to perform:

detecting an unconfirmed second change in a second record, the second record being changed by a second transaction having a second starting time, the second starting time being before the first starting time;

in response to detecting the unconfirmed second change, refraining from updating a watermark corresponding to the first record; and refraining from synchronizing the first change with the materialized view until the unconfirmed second change has been confirmed.

19. The method of claim 12, wherein updating the materialized view using the initial incremental updates and the additional incremental updates comprises removing duplicates from the additional incremental updates that also occur in the initial incremental updates.

20. One or more non-transitory computer storage media encoded with computer program instructions that when executed by one or more computers cause the one or more computers to perform operations comprising:

receiving a request to perform an incremental update of a materialized view generated from constituent records stored in a source database;

detecting, based on watermarks of the constituent records, one or more changes that were committed in the constituent records relative to a time that the materialized view was last updated;

synchronizing the materialized view with the one or more detected changes including executing a first query to obtain initial incremental updates based on the watermarks of the constituent records;

determining that an uncaptured long-running transaction was initiated before the latest incremental update of the initial incremental updates;

in response to determining that an uncaptured long-running transaction was initiated before the latest incremental update of the initial incremental updates, executing a subsequent query to capture additional incremental updates committed by the long-running transaction after the request to perform the incremental update was received;

updating the materialized view within a data platform of the multi-tenant system using the initial incremental updates and the additional incremental updates; and transmitting the synchronized materialized view to a target database accessible by tenants.

* * * * *